US012307728B2

(12) United States Patent
Taquet et al.

(10) Patent No.: US 12,307,728 B2
(45) Date of Patent: May 20, 2025

(54) METHOD AND SYSTEM FOR AZIMUTHAL ANGULAR PRIOR AND TREE REPRESENTATION FOR CLOUD COMPRESSION

(71) Applicant: BlackBerry Limited, Waterloo (CA)

(72) Inventors: Jonathan Taquet, Talensac (FR); Sébastien Lasserre, Thorigné-fouillard (FR)

(73) Assignee: BlackBerry Limited, Waterloo (CA)

( * ) Notice: Subject to any disclaimer, the term of this patent is extended or adjusted under 35 U.S.C. 154(b) by 463 days.

(21) Appl. No.: 17/771,246

(22) PCT Filed: Oct. 31, 2019

(86) PCT No.: PCT/IB2019/001235
§ 371 (c)(1),
(2) Date: Apr. 22, 2022

(87) PCT Pub. No.: WO2021/084292
PCT Pub. Date: May 6, 2021

(65) Prior Publication Data
US 2022/0398784 A1 Dec. 15, 2022

(51) Int. Cl.
*G06T 9/40* (2006.01)

(52) U.S. Cl.
CPC .................................... *G06T 9/40* (2013.01)

(58) Field of Classification Search
CPC ................................ G06T 9/40; G06T 9/001
See application file for complete search history.

(56) References Cited

U.S. PATENT DOCUMENTS 11,871,037 B2 1/2024 Ramasubramonian et al.
11,895,307 B2 * 2/2024 Mammou ................ G06T 9/40
(Continued)

FOREIGN PATENT DOCUMENTS

| CN | 101032172 A | 9/2007 |
|---|---|---|
| CN | 106846425 A | 6/2017 |
| CN | 108769679 A | 11/2018 |

OTHER PUBLICATIONS

S. Schwarz et al., "Emerging MPEG Standards for Point Cloud Compression," in IEEE Journal on Emerging and Selected Topics in Circuits and Systems, vol. 9, No. 1, pp. 133-148, Mar. 2019, doi: 10.1109/JETCAS.2018.2885981. https://ieeexplore.ieee.org/document/8571288 (Year: 2019).*
(Continued)

*Primary Examiner* — Matthew C Bella
*Assistant Examiner* — Andrew B. Jones
(74) *Attorney, Agent, or Firm* — Moffat & Co

(57) ABSTRACT

A method of encoding or decoding a point cloud to representing a three-dimensional location of an object, the point cloud being located within a volumetric space, the method including determining at least one closest, relative to azimuthal distance, encoded node to a current node; determining an azimuthal prediction angle for each of the at least one closest encoded node; finding an averaged azimuthal prediction angle from the determined azimuthal prediction angle for each of the at least one closest encoded node; selecting an angular azimuthal context based on the averaged azimuthal predication angle; encoding information representative of the current node based on the azimuthal context to generate the bitstream of compressed point cloud data or decoding information representative of the current node based on the azimuthal context to generate the point cloud data.

18 Claims, 26 Drawing Sheets

(56) References Cited

U.S. PATENT DOCUMENTS

| | | | |
|---|---|---|---|
| 11,941,855 | B2 | 3/2024 | Ray et al. |
| 2011/0282581 | A1 | 11/2011 | Zeng |
| 2016/0086353 | A1 | 3/2016 | Lukac et al. |
| 2017/0214943 | A1 | 7/2017 | Cohen et al. |
| 2017/0347100 | A1 | 11/2017 | Chou et al. |
| 2019/0156520 | A1 | 5/2019 | Mammou et al. |
| 2021/0327095 | A1 | 10/2021 | Van Der Auwera et al. |
| 2021/0327098 | A1 | 10/2021 | Ray et al. |
| 2021/0327099 | A1 | 10/2021 | Van Der Auwera et al. |
| 2021/0407143 | A1 | 12/2021 | Van Der Auwera et al. |
| 2021/0409778 | A1 | 12/2021 | Ramasubramonian et al. |
| 2022/0337872 | A1 | 10/2022 | Park et al. |
| 2022/0366610 | A1 | 11/2022 | Hur et al. |

OTHER PUBLICATIONS

China National Intellectual Property Administration (CNIPA): Office Action for Application No. 201980101940.0, dated Sep. 5, 2024, 5 pages.

United States Patent and Trademark Office (USPTO) Notice of Allowance and Fee(s) Due for U.S. Appl. No. 17/771,354 mailed Jul. 26, 2024, 55 pages.

Korean Intellectual Property Office office action for Application No. 10-2022-7017138 dated Dec. 26, 2023, 3 pages (4 pages English translation).

Patent Cooperation Treaty, International Search Report for International application No. PCT/IB2019/001235 mailed Apr. 29, 2020.

Asserre (Blackberry) S et al: "[GPCC][CE 13.22 related] The azimuthal coding mode", 129, MPEG Meeting; Jan. 2020, Brussels, XP030224661.

Lasserre (Blackberry) S et al: "[GPCC][CE 13.22 related] An improvement of the planar coding mode", 128, MPEG Meeting; Oct. 7-11, 2019, Geneva, XP030221087.

Lasserre (Blackberry) S et al: "[GPCC][new input] Planar mode in octree based geometry coding", 127, MPEG Meeting; Jul. 2019, Geneva, XP030222328.

United States Patent and Trademark Office (USPTO) Office Action for U.S. Appl. No. 17/765,015 mailed Jun. 12, 2024, 22 pages.

In-Wook Song et al., "Progressive compression of PointTexture images" Article in Proceedings of SPIE, Visual Communications and Image Processing 2004, Jan. 2004, 4 pages.

Miguel Branco Roque Nazare Ferreira, "Dynamic 3D Point Cloud Compression", Master of Science Thesis from Tecnico Lisboa, Nov. 2017, 110 pages.

Sebastian Schwarz et al., "Emerging MPEG Standards for Point Cloud Compression" IEEE Journal on Emerging and Selected Topics in Circuits and Systems, Mar. 2019, vol. 9, No. 1, 16 pages.

Armin Hornung et al. "OctoMap: an efficient probabilistic 3D mapping framework based on octrees", Autonomous Robots, 2013, Preprint, 17 pages.

Chenxi Tu et al. "Real-Time Streaming Point Cloud Compression for 3D LiDAR Sensor Using U-Net", IEEE Access, received Jun. 25, 2019, accepted Aug. 2, 2019, date of publication Aug. 14, 2019, date of current version Aug. 28, 2019, 10 pages.

"G-PCC codec description v4" ISO/IEC JTC 1 S/C 29 W/G 11 coding of moving pictures and audio convenorship: UNI (Italy), Jul. 2019, 62 pages.

European Patent Office (EPO), Extended European Search Report (EESR), Application No. 19200890.2, Dated: Mar. 20, 2020, 11 pages.

Jae-Kyun Ahn et al., "Large Scale 3D Point Cloud Compression Using Adaptive Radial Distance Prediction in Hybrid Coordinate Domains" in IEEE Journal of Selected Topics in Signal Processing, Apr. 2015, vol. 9, No. 3, pp. 422-434.

Ismael Daribo et al., "Adaptive Arithmetic Coding For Point Cloud Compression". 2012 3DTV-Conference: The True Vision-Capture, Transmission and Display of 3D Video (3DTV-CON), Zurich, Switzerland, 2012, pp. 1-4.

Stefan Gumhold et al., "Predictive point-cloud compression", Jul. 31, 2005, 1077952576-1077952576, Jul. 2005, pp. 137-es, XP058302295.

Gustavo Sandri et al., "Point Cloud Compression Incorporating Region of Interest Coding", 126 MPEG Meeting, Mar. 2019, 6 pages.

Sebastien Lasserre et al., An improvement of the planar coding mode (paper), ISO/IEC JTC1/SC29/WG11 MPEG2019/m50642, Oct. 2019, Geneva, CH, 4 pages.

Patent Cooperation Treaty, International Search Report for International Application No. PCT/IB2019/001268, mailed Jun. 8, 2020, 3 pages.

Korean Intellectual Property Office: Office Action for Application No. 10-2022-7014079, Dated: Oct. 21, 2024, 3 pages.

United States Patent and Trademark Office (USPTO): Notice of Allowance for U.S. Appl. No. 17/765,015, Dated: Sep. 29, 2024, 20 pages.

* cited by examiner (a)

(b)

METHOD AND SYSTEM FOR AZIMUTHAL ANGULAR PRIOR AND TREE REPRESENTATION FOR CLOUD COMPRESSION

FIELD OF THE DISCLOSURE

The present disclosure generally relates to point cloud compression and, in particular to methods and devices for improved compression of occupancy data in tree-based coding of point clouds and of point coordinate data.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like color data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds. Such methods may result in savings in storage requirements (memory) through improved compression, or savings in bandwidth for transmission of compressed data, thereby resulting in improved operation of 3D vision systems, such as for automotive applications, or improved speed of operation and rendering of virtual reality systems, as examples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
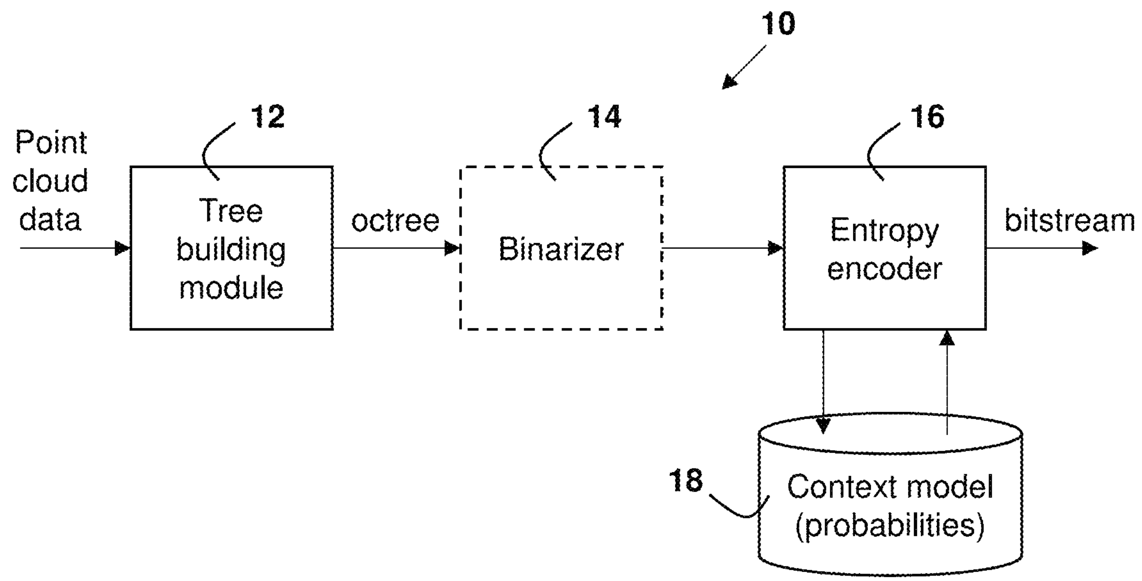
FIG. 1 shows a simplified block diagram of an example point cloud encoder.

The present application describes methods of encoding and decoding point clouds, and encoders and decoders for encoding and decoding point clouds.

In one aspect, the present disclosure describes a method of encoding a point cloud to generate a bitstream of compressed point cloud data representing a three-dimensional location of an object, the point cloud being located within a volumetric space and represented by a tree, the method comprising: determining at least one closest, relative to azimuthal distance, coded node to a current node of the tree; determining an azimuthal prediction angle for each of the at least one closest coded node; finding an averaged azimuthal prediction angle from the determined azimuthal prediction angle for each of the at least one closest coded node; selecting an angular azimuthal context based on the averaged azimuthal predication angle; and coding information representative of the current node based on the azimuthal context to generate the bitstream of compressed point cloud data.

In one aspect, the present disclosure also describes a method of decoding a bitstream of compressed point cloud data representing a three-dimensional location of an object, for generating a point cloud data, the point cloud being located within a volumetric space and represented by a tree, the method comprising: determining at least one closest, relative to azimuthal distance, coded node to a current node of the tree; determining an azimuthal prediction angle for each of the at least one closest coded node; finding an averaged azimuthal prediction angle from the determined azimuthal prediction angle for each of the at least one closest coded node; selecting an angular azimuthal context based on the averaged azimuthal predication angle; and decoding information representative of the current node based on the azimuthal context to generate the point cloud data.

In another aspect, the present disclosure describes that the prediction angle is determined based on a sum of already coded nodes azimuthal angles divided by an error, all divided by a sum of the inverse of the error for already coded nodes.

In another aspect, the present disclosure describes that the determining at least one closest coded node excludes nodes that are larger in size than the current node and/or excludes nodes that are greater than a threshold azimuthal distance from the current node.

In another aspect, the present disclosure describes that the encoding or decoding is in a planar mode, and wherein the method further comprises determining a left azimuthal angle and a right azimuthal angle for the current node, wherein the selecting the angular further comprises: assigning a first bit based on whether the azimuthal prediction angle minus the left azimuthal angle has the same sign as the azimuthal prediction angle minus the right azimuthal angle; assigning a second bit based on which of the azimuthal prediction angle minus the left azimuthal angle and the azimuthal prediction angle minus the right azimuthal angle has a largest absolute magnitude; providing a quantized context index based on a magnitude difference between the azimuthal prediction angle minus the left azimuthal angle and the azimuthal prediction angle minus the right azimuthal angle, times an inverse of a radius to the current node.

In another aspect, the present disclosure describes that the method further comprises selecting an x plane position and/or a y plane position for azimuthal prediction based on a location of the current node relative to the x axis or the y axis.

In another aspect, the present disclosure describes that the encoding or decoding is in an inferred direct coding mode ("IDCM"), and wherein the method further comprises: initializing a coordinate interval; recursively splitting the interval by: determining a left azimuthal angle and a right azimuthal angle for the current node; performing the selecting the angular context by further using the left azimuthal angle and the right azimuthal angle with the azimuthal prediction angle; updating, after the encoding or decoding, the coordinate interval.

In another aspect, the present disclosure describes that the determining the left azimuthal angle and the right azimuthal angle are based on two points located at ¼ and ½ of the interval.

In another aspect, the present disclosure describes that the determining the left azimuthal angle and a right azimuthal angle uses a first order approximation from previous values of the left azimuthal angle and a right azimuthal angle and/or the azimuthal prediction angle.

In another aspect, the present disclosure describes that the encoding or decoding uses a predicted-point tree, and wherein the method further comprises: determining a prediction of a point associated with the current node prior determining the azimuthal prediction angle; initializing a coordinate interval for a coordinate from the prediction and a size of a residual; for each bit in the residual: determining a left azimuthal angle and a right azimuthal angle for the current node; performing the selecting the angular context by further using the left azimuthal angle and the right azimuthal angle with the azimuthal prediction angle; performing the encoding or decoding for the highest order remaining bit for the coordinate; and updating, after the encoding or decoding, the coordinate interval.

In another aspect, the present disclosure further describes updating the azimuthal prediction angle after updating the coordinate interval.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data. The tree-like structure of partitioning of volumes into sub-volumes may be referred to as a "parent" and "child" relationship, where the sub-volumes are child nodes or child sub-volumes to the parent node or parent volume. Sub-volumes within the same volume may be referred to as sibling nodes or sibling sub-volumes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three components value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-colored, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points much more challenging.

Tree-Based Structures

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

The three-dimensional volume for the point cloud can also be define by using a bounding box. A quad-tree plus binary-tree (QTBT) structure for the bounding box allow to partition the point-cloud in non-cubic volumes which may better represent the overall shape of the point cloud or objects within the point-cloud. A quad-tree (QT) partitioning splits a volume into four sub-volumes, for example by splitting the volume using two planes cutting the volume into four parts. A binary tree (BT) partitioning splits a volume into two sub-volumes, for example by splitting the volume using one plane cutting the volume into two parts.

A commonly-used tree structure is an octree. In this structure, the volumes/sub-volumes are all cubes (or more generally cuboids) and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. A KD-tree may typically be obtained by applying recursively a Binary Tree (BT) partitioning.

The partitioning of a volume is not necessarily into two sub-volumes (KD-tree) or eight sub-volumes (octree), but could involve other partitions, including division into non-cuboid shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing the point cloud and indicating the location or position of points from the point cloud in that geometry.

In the case of a uniformly partitioned tree structure, like an octree, each node may be represented by a sequence of occupancy bits, where each occupancy bit corresponds to one of the sub-volumes in the node and signals whether than sub-volume contains at least one point or not. Occupied sub-volumes are recursively split up to a maximum depth of the tree. This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8-1$ bit number (e.g. an integer having a value between 1 and 255 since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a "pattern".

A convention that is typically used in point cloud compression is that an occupancy bit value of "1" signals that the associated node or volume is "occupied", i.e. that it contains at least one point, and an occupancy bit value of "0" signals that the associated node or volume is "unoccupied", i.e. that it contains no points. More generally, an occupancy bit may have a value indicating occupied or a value indicating unoccupied. In the description below for ease of explanation, example embodiments may be described in which the convention of 1=occupied and 0=unoccupied is used; however, it will be understood that the present application is not limited to this convention.

Figure 2:
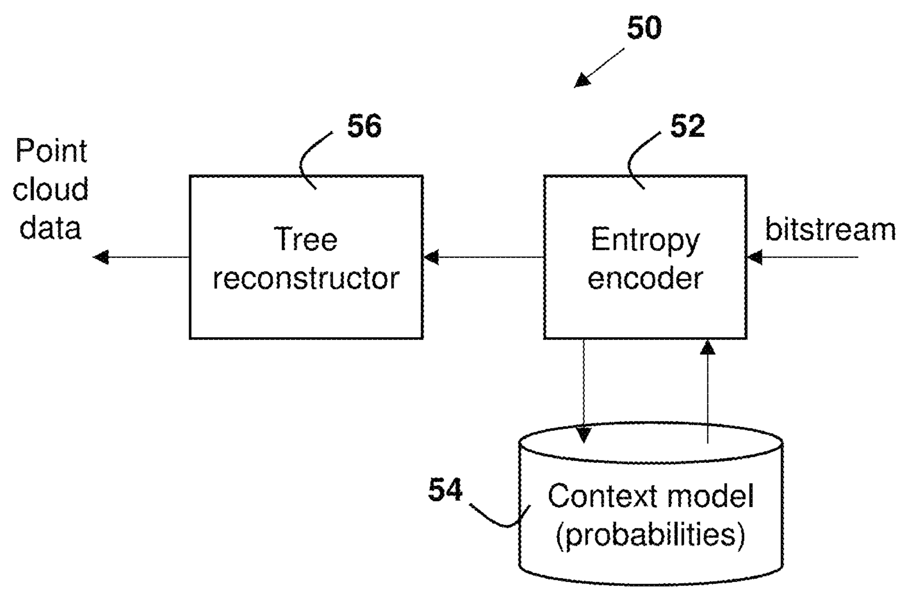
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

In European patent application no. 18305037.6, the present applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighboring the particular node. The contents of European patent application no. 18305037.6 are incorporated herein by reference. This is referred to as determining a "neighbor configuration" and selecting a context (i.e. a pattern distribution) at least partly based on the neighbor configuration.

In European patent application no. 18305415.4, the present applicants described methods and devices for binary entropy coding occupancy patterns. The contents of European patent application no. 18305415.4 are incorporated herein by reference.

Inferred Direct Coding Mode (IDCM)

One of the problems with compressing point cloud data in a tree-structure is that it does not necessarily deal with isolated points very well. The recursive splitting of the sub-volume and the location of points within the split sub-volumes involves computational burden and time, and the signaling of recursive splitting of sub-volumes to pinpoint the location of one or a few isolated points can be costly in terms of bandwidths/memory storage, as well as computational time and resources. Furthermore, isolated points "pollute" the distribution of patterns, inducing many patterns with only one occupied child, thus changing the balance of the distribution and penalizing the coding of other patterns.

Therefore, the direct coding of positional information for isolated points has been proposed. The direct coding of a point's position, e.g. coordinates within a volume or sub-volume, may be termed Direct Coding Mode (DCM). As it would be highly inefficient to use DCM for all points, one option is to signal, for each occupied node, using a dedicated flag, whether DCM will be used for any points within that node; however, this option may result in excessive overhead cost in signaling, thereby producing worse compression performance.

Another option is to determine the eligibility to use DCM for an occupied node based on occupancy information from other nodes. If the occupied node is eligible to use DCM, then a flag is inserted in the bitstream to signal whether DCM is applied or not. This approach may be termed Inferred Direct Coding Mode (IDCM).

The eligibility conditions for IDCM for a tree whose volumes are made of adjacent cuboids may be: A) none of the six neighboring cuboids (top, bottom, forward, back, left, right) are occupied; or in the case where the neighboring cuboids' occupancy is unknown, B) the number of occupied nodes in the parent pattern is equal to one, i.e. the current node is isolated at the parent level. In some cases it may be beneficial to apply either conditions A) and B) with condition C) the number of occupied nodes in the grand-parent pattern is equal to one, i.e. the current node is also isolated at the grand-parent level. Furthermore, the threshold for the number of occupied parent or grand-parent nodes may be other than one.

If a node is eligible for DCM, then a flag is coded to signal whether DCM is applied or not. This flag may be determined by an encoder based upon the number of points belonging to the volume attached to the node. If this number is less than or equal to a threshold, DCM is activated, and otherwise it is not.

Therefore, in accordance with another aspect of the present application, the eligibility to use DCM for an occupied node is determined based on occupancy information from other nodes. If the occupied node is eligible to use DCM, then a flag is inserted in the bitstream to signal whether DCM is applied or not.

When DCM is applied, the coding of points may be performed by coding the number of points using a truncated unary binarizer followed by a binary entropy coder, but other binarizations may be used depending on the threshold selected for eligibility, and by coding the X, Y, and Z coordinates of each point independently, relative to the volume associated with the node. For example, if the volume is a cube that has sides of size $2^D$, then D bits will be needed for each coordinate of each point.

The value of the threshold should be known by the decoder, either implicitly or as a coded parameter.

Planar Mode

Certain types of point cloud data tend to have strong directionality. Non-natural environments in particular exhibit strong directionality as those environments tend to feature uniform surfaces. For example, in the case of LiDAR, the roadway and the walls of adjacent buildings are generally horizontally or vertically planar. In the case of interior scans within rooms, the floor, ceiling and walls are all planar. LiDAR for the purpose of automotive vision and similar applications tends to be lower resolution and also needs to be compressed quickly and efficiently.

Octrees are efficient tree structures because they are based around a uniform partitioning process of equal division of a cube into eight sub-cubes using three orthogonal planes in every case, so signaling their structure is efficient. However, octrees using current signaling processes are not able to exploit the efficiencies available from recognizing the planar nature of some non-natural environments. KD-trees, however, are able to better tailor the partitioning to the directionality of the point cloud. This makes them a more efficient and effective structure for these types of environments. The downside to KD-trees is that the signaling of their structure requires significantly more data than octrees. The fact that KD-trees are non-uniform means that some of the techniques used to improve octree compression are unavailable to KD-trees or would be computationally difficult to implement.

Accordingly, in some cases, it is advantageous to have a mechanism for representing non-natural environments using a uniform partitioning-based tree structure in a manner that improves compression by exploiting horizontal and/or vertical directionality.

In some cases, point cloud compression can be improved by a planar coding mode. The planar mode is used to indicate that a volume meets certain requirements for planarity in terms of its occupancy. In particular, a volume is planar if all of its occupied sub-volumes are positioned or located in a common plane. The syntax for signaling may indicate whether a volume is planar and, if so, the position of the common plane. Through exploiting this knowledge of planarity, gains in compression may be achieved. Applying criteria for eligibility to enable the planar mode and mechanisms for context-adaptive coding of the planar mode signaling help improve compression performance.

Planarity is generally presumed to be with respect to a Cartesian axis aligned with the structure of the volumes and sub-volumes. That is, a volume is planar if all its occupied sub-volumes are positioned in a common plane orthogonal to one of the axes. As a convention, the z-axis is vertical, meaning that the (horizontal) plane is orthogonal to the z-axis.

For an eligible node, a flag, referred to herein as “isPlanar”, may be added to signal whether the node is planar. The flag may be entropy coded using prediction techniques. In view of generalizing to x-planar and y-planar modes, the syntax may be composed of 3 flags, referred to herein as: isZPlanar, isXPlanar, and isYPlanar.

Figure 3:
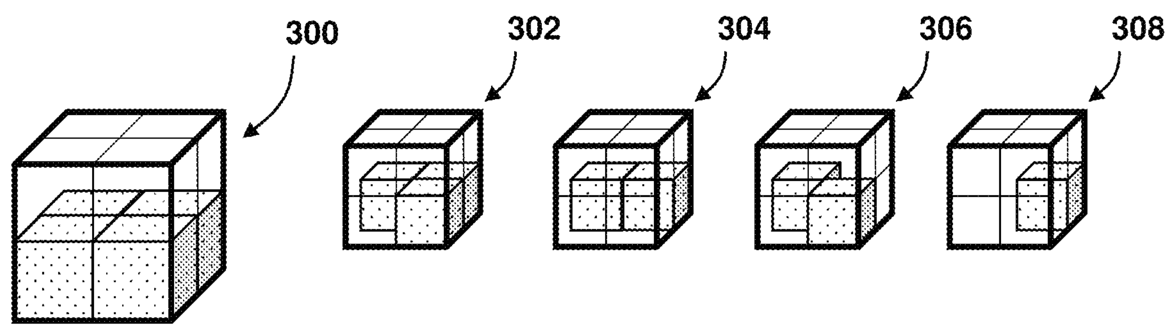
FIGS. 3 and 4 illustrate examples of a volume exhibiting planarity in its occupied child sub-volumes.
Figure 4:
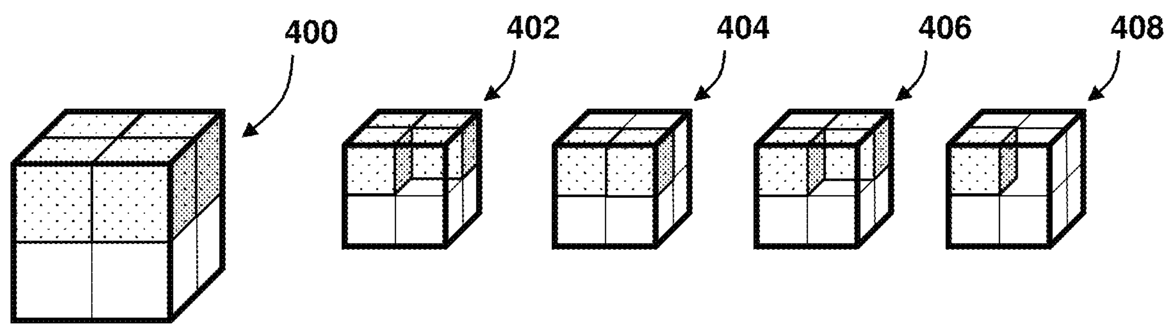

In some embodiments, a node is said to be planar if all its occupied child nodes belong to the same horizontal plane. In the case of octrees, such a plane consists of four child nodes, one of which is necessarily occupied. As shown in FIGS. 3 and 4, the horizontal plane can be located at the bottom of the current node, corresponding to a first value of a flag “planePosition”, e.g. 0, as shown by block 300, or at the top of the current node, corresponding to a second value of planePosition, e.g. 1, as shown by block 400.

Therefore, if the current node is planar, an extra bit planePosition is added to the syntax to indicate the plane position. This bit is also entropy coded.

The knowledge of the planar status of the current node helps coding the occupancy pattern. For example, if the node is z-planar, the four occupancy bits associated with the child nodes belonging to the empty horizontal plane need not be coded. Similarly, if the current node is not planar, it can be assumed that there is at least one occupied child node per horizontal plane, and this knowledge can be used to better compress the bitstream.

Various occupancy examples for the case where the planePosition is the bottom is shown in FIG. 3 as blocks 302, 304, 306, and 308. Similarly, various occupancy examples for the case where the planePosition is the top is shown in FIG. 4 as blocks 402, 404, 406, and 408

Figure 5:
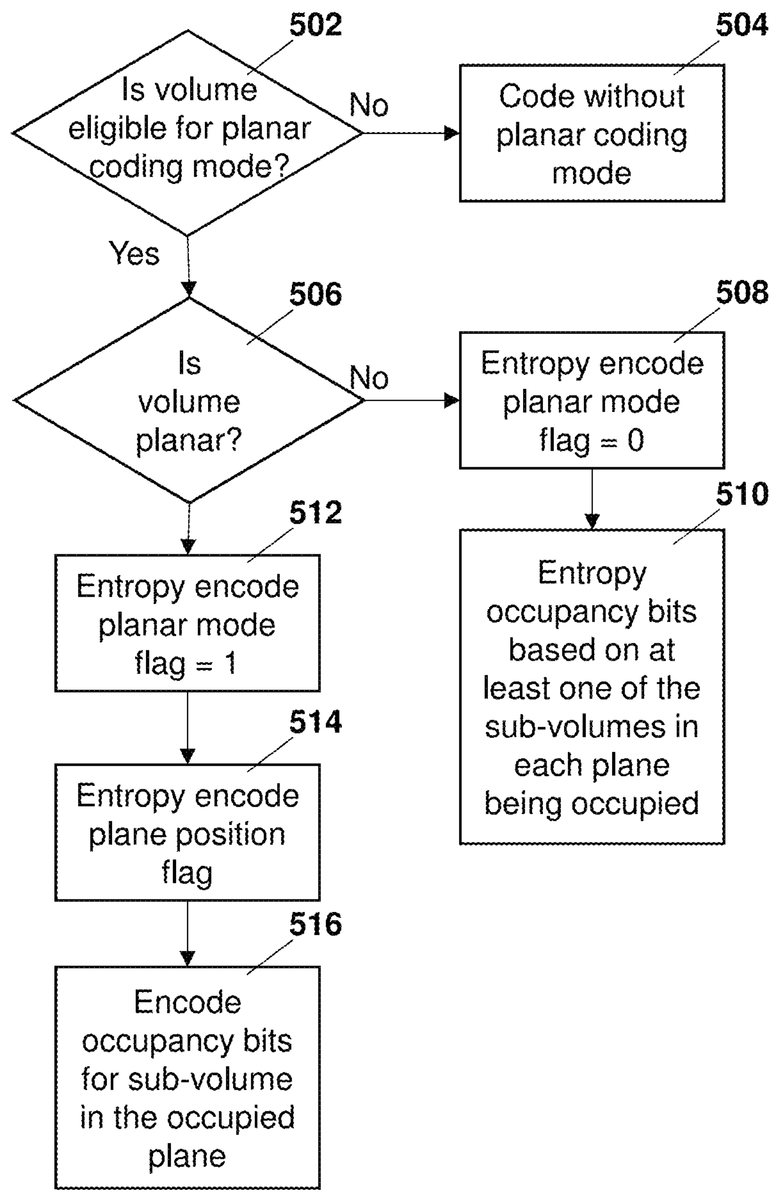
FIG. 5 shows, in flowchart form, one example method of encoding point cloud data using a planar coding mode.

A method for encoding a node in planar mode is shown with respect to FIG. 5. The method of FIG. 5 reflects the process for encoding occupancy information for a volume. In this example, the volume is uniformly partitioned into eight sub-volumes, each having an occupancy bit, in accordance with octree-based coding. For simplicity, the present example assumes only one (e.g. horizontal) planar mode is used.

At block 502, the encoder assesses whether the volume is eligible for planar coding mode. Eligibility may be based on cloud density in one example, which may be assessed using mean number of occupied child nodes. To improve local adaptation, eligibility may be based on probability factor tracking. If planar coding mode is not eligible, then the occupancy pattern for the volume is encoded without using planar coding mode, as indicted by block 504.

If planar mode is enabled, then in block 506 the encoder assesses whether the volume is planar. If not, then in block 508 the process encodes the planar mode flag, e.g. isPlanar=0. In block 510 the encoder then encodes the occupancy pattern using the fact that there is at least one occupied sub-volume per plane. That is, the occupancy pattern is encoded and if the first three bits coded for either plane (upper or lower) are zero then the last (fourth) bit for that plane is not coded and is inferred to be one since the corresponding sub-volume must be occupied.

If planar mode is enabled and the volume is planar, then in block 512 the planar mode flag is encoded, e.g. isPlanar=1. Because the volume is planar, the encoder then also encodes the plane position flag, planePosition. The plane position flag signals whether the planar occupied sub-volumes are in the upper half or lower half of the volume. For example, planePosition=0 may correspond to the lower half (i.e. lower z-axis position) and planePosition=1 may correspond to the upper half. The plane position flag is then encoded at block 514. The occupancy bits are then encoded based on knowledge of the planarity of the volume and the position of the occupied sub-volumes at block 516. That is, up to four bits are encoded since four may be inferred to be zero, and the fourth bit may be inferred to be one if the first three encoded are zero.

LiDAR-Acquired Point Clouds

Typically, LiDAR-acquired point clouds are acquired by a set of spinning lasers. An exemplary LiDAR device is shown with respect to FIG. 6.

Figure 6:
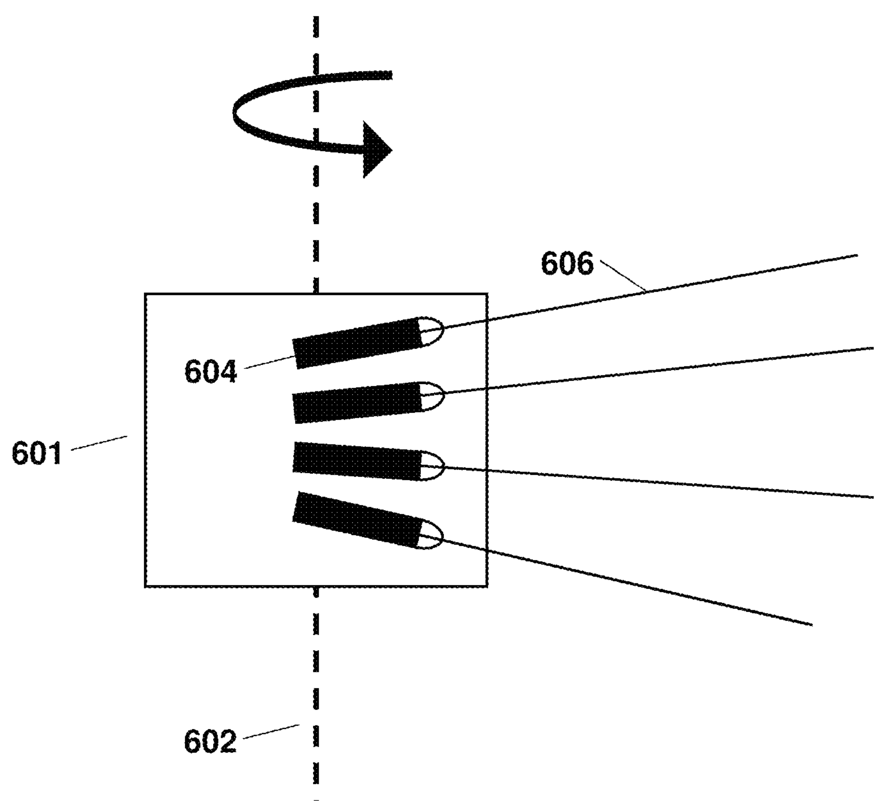
FIG. 6 shows a simplified illustration of an example of a beam assembly for acquiring point clouds.

As seen in FIG. 6, the LiDAR device 601 comprises a vertically arranged array of lasers 604 mounted on a spinning head, such that each laser rotates around the head axis 602. Each laser emits a laser beam 606.

Figure 7:
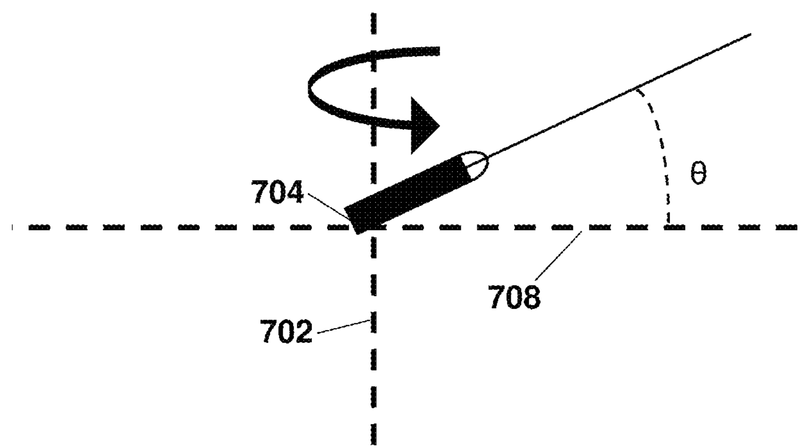
FIG. 7 shows a simplified illustration of an example of a single beam emitter in the beam assembly.

Reference is now made to FIG. 7, which illustrates a single laser 704 rotating around a head axis 702 and having an angle θ with respect to the plane 708. The plane 708 is perpendicular to the head axis 702. Naturally, points acquired by the laser will have an angle of acquisition which will be very close to 0, due to noise and measurement precision.

Figure 8:
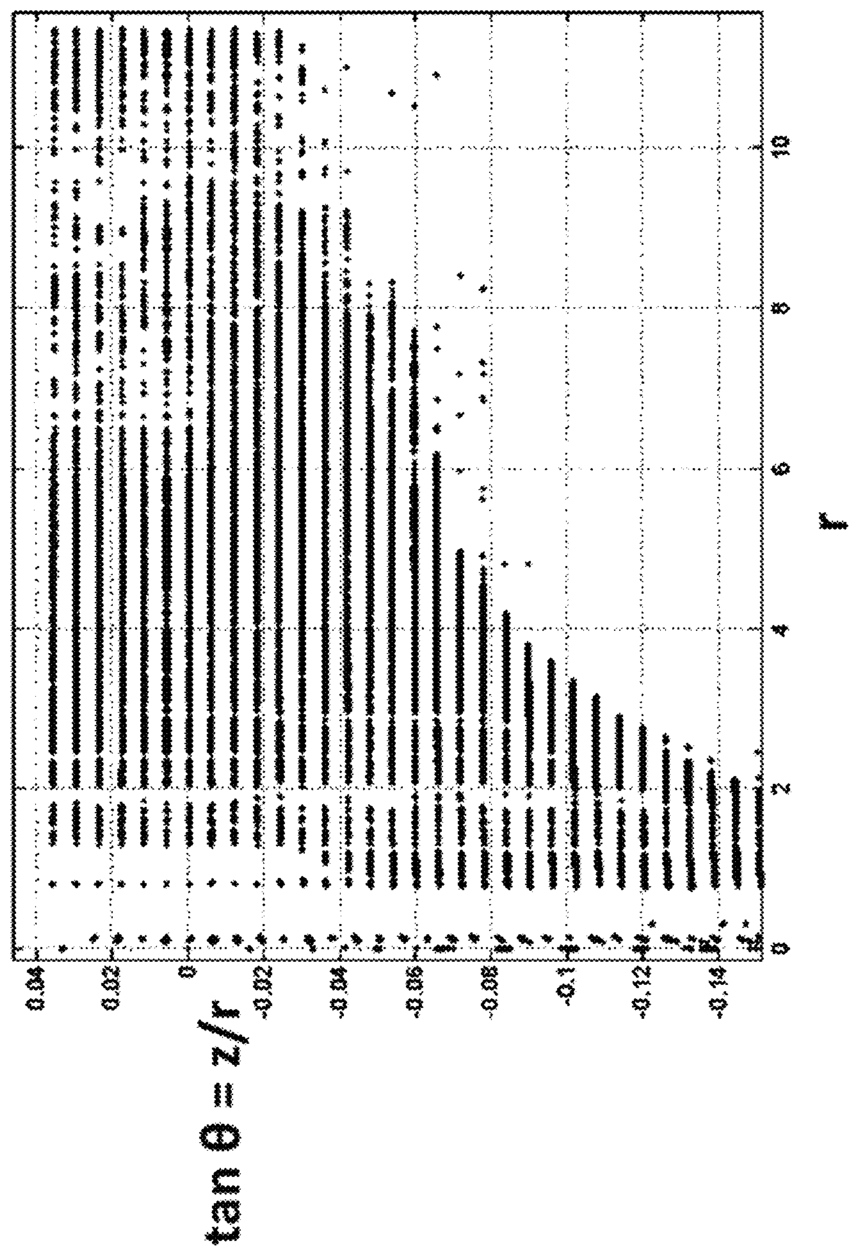
FIG. 8 shows a diagram including points of an example point cloud expressed in the (r, θ) plane.
Figure 9:
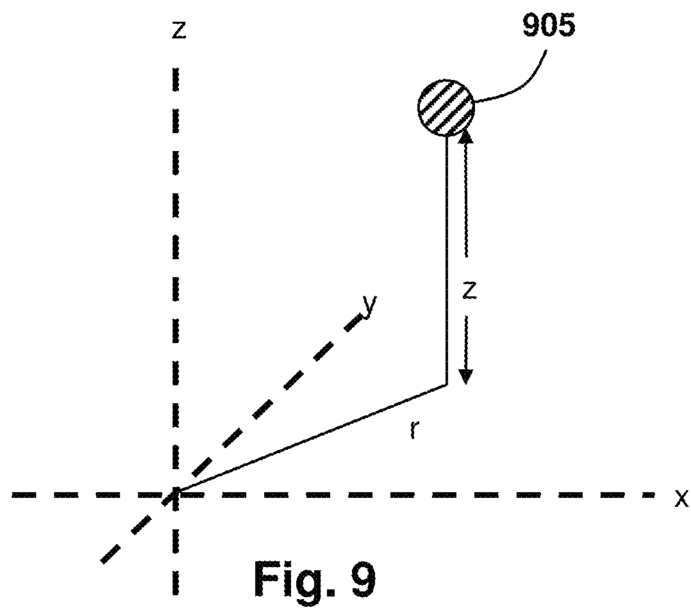
FIG. 9 shows an example assignment of coordinate axes relative to a point of the point cloud.

FIG. 8 illustrates points of a LiDAR-acquired point cloud on a diagram where the vertical axis represents tan(θ), or z/r, and the horizontal axis represents r. By definition and as shown in FIG. 9, r is the horizontal distance of a point from the Lidar's head (or beam assembly in general), and the tangent of the vertical angle tan(θ) is defined as the ratio z/r where z is the vertical elevation of the point 905 relative to the LiDAR's head.

Somewhat fixed laser angles tan(θ) can be clearly observed in the diagram. Positive angles signify that the lasers are pointed above the horizontal plane (i.e., towards the sky), while negative angles signify that the lasers are pointed below the horizontal plane (i.e., to the ground). Notably, lasers of the LiDAR are deliberately oriented at different angles—e.g., so that different lasers pick up different parts of the same tall object, like buildings, poles, trees, etc.

As can be seen from FIG. 8, the points of the point cloud can be represented in a "quasi" 2D space. For example, a representation is theoretically possible in the 2D space (x,y) and a finite set of vertical angles θ corresponding to the laser beams. Or equivalently in the 2D polar space (y, r), where y is the azimuthal angle, and the finite set of vertical angles θ. In other words, one may represent the points in spherical coordinates (φ, r, θ) where θ can take only a finite number of values. This is a consequence of occlusions, which lead to only at most one point per (φ, θ). This quasi 2D space is theoretical but, practically, measurement noise/precision and time integration does not lead to a strictly finite set of possible θ, which is a consequence of the mechanical mounting of the lasers. Instead, it is observed that the values of θ are spread around a finite number of values $\theta_{laser}$ and one must deal with the issue of "noise" around these values.

The aforementioned quasi-2D structure depends mainly on the position/orientation of one or more LiDARs (or beam assemblies in general) and the intrinsic characteristics of the LiDAR(s). As will be described in more detail below, it can be thus advantageous to include syntax elements (e.g., parameters, flags) into the bitstream that described characteristics of the LiDAR(s) (or beam assembly/assemblies in general). These syntax elements may indicate at least one of a reference location of the beam assembly, origin locations of specific beams, or beam angles of specific beams. Including these syntax elements into the bitstream can be done at a frame or sequence level. In any case, this data should be present as close as possible to the compressed data bitstream to ensure decodability of the bitstream and minimize the risk of losing data needed for decodability.

Taking note of the above, some embodiments of the application seek to use knowledge obtained from LiDAR characteristics (or characteristics of the relevant beam assemblies), of vertical laser angles $\theta_{laser}$ in an efficient representation of the point cloud such that the compression is improved.

Corrected Elevation Angles

Let ($x_{Lidar}$, $y_{Lidar}$, $z_{Lidar}$) be the location of a LiDAR's head (or beam assembly in general), oriented vertically along the z axis in the three-dimensional space XYZ (volumetric space) to which the points of the point cloud belong. The tangent tan(θ) of the vertical angle θ of a point (x,y,z) is the ratio of the elevation $z-z_{Lidar}$ and the distance r of the point relatively to the head. This is shown, for example, in Equation 1.

$$\tan\theta=(z-z_{Lidar})/\sqrt{(x-x_{\mathrm{Lidar}})^2+(y-y_{\mathrm{Lidar}})^2} \quad (1)$$

Figure 11:
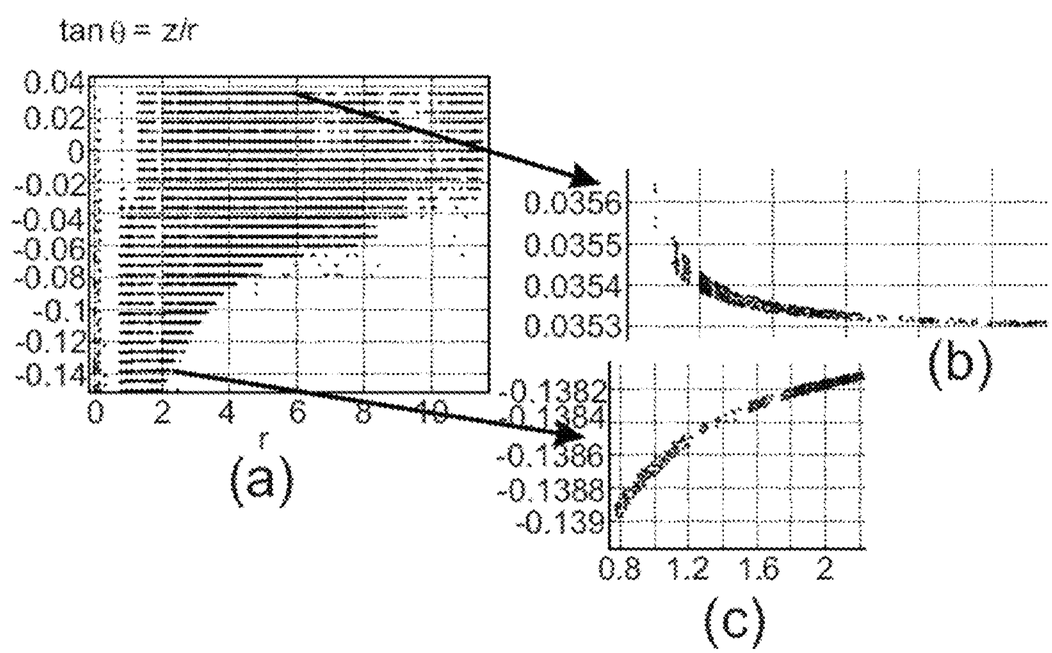
FIG. 11 shows details of the diagram in FIG. 8.

As can be seen from the diagram of FIG. 11, which shows detailed views relative to FIG. 8, the angle tan(θ) is somewhat constant, but not strictly constant, for the points probed by the same beam. In fact, there exists for each beam a respective envelope in the (r, tan(θ)) diagram that contains the points acquired by this beam. The width of this envelope (in the tan(θ) direction) clearly depends on the distance r. The width of this envelope is due to noise and acquisition precision, and widens for lower r. Notably, the envelopes for adjacent beams do not intersect with each other.

A corrected angle $\theta_{corr}$ that exhibits a more stable value through a wide range of r can be obtained by adding a correction term to the position of each laser relative to the head position.

Figure 10:
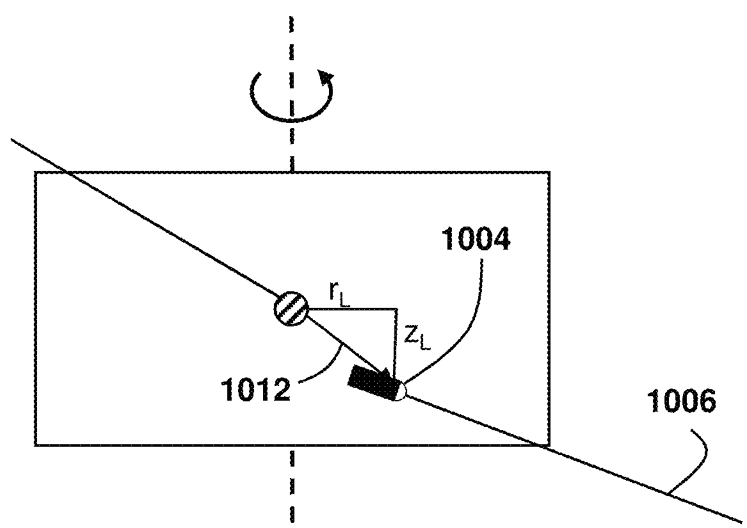
FIG. 10 shows an example of an arrangement of a beam emitter of the beam assembly relative to a reference location of the beam assembly.

FIG. 10 schematically illustrates a location of a beam emitter 1004 relative to the reference location of the beam assembly, for explaining an example method of correcting the angle θ to obtain a corrected angle $\theta_{corr}$. In particular, the position of a beam emitter 1004 is corrected by a shift 1012 defined by coordinates ($r_L$, $z_L$) relative to the reference position of the beam assembly such that the beam 1006 is emitted from the vertical location $z_{Lidar}+z_L$ and the distance of a point to the beam emitter 1004 is corrected to become $r-r_L$, where L is the beam emitter index. As such, the corrected location of the beam emitter 1004 may be referred to as an origin location or beam origin location for the beam 1006. The corrected angle $\theta_{corr}$ depends on the beam emitter index L and is provided by equation 2 below.

$$\tan\theta_{corr,L}=(z-z_{Lidar}-z_L)/(\sqrt{(x-x_{\mathrm{Lidar}})^2+(y-y_{\mathrm{Lidar}})^2}-r_L) \quad (2)$$

For points not too close to the beam assembly, i.e. for not too small values of the distance r, this angle can be approximated as shown in equation 3.

$$\tan\theta_{corr,L}\approx(z-z_{Lidar}-z_L)/\sqrt{(x-x_{\mathrm{Lidar}})^2+(y-y_{\mathrm{Lidar}})^2}=\tan\theta-z_L/r \quad (3)$$

Only the vertical correction $z_L$ is needed, while the radial correction $r_L$ may be neglected. As such, the beam origin position may be determined, starting from the reference location of the beam assembly, based on a relative displacement that can be expressed in terms of ($r_L$, $z_L$) or only in terms of $z_L$.

Figure 12:
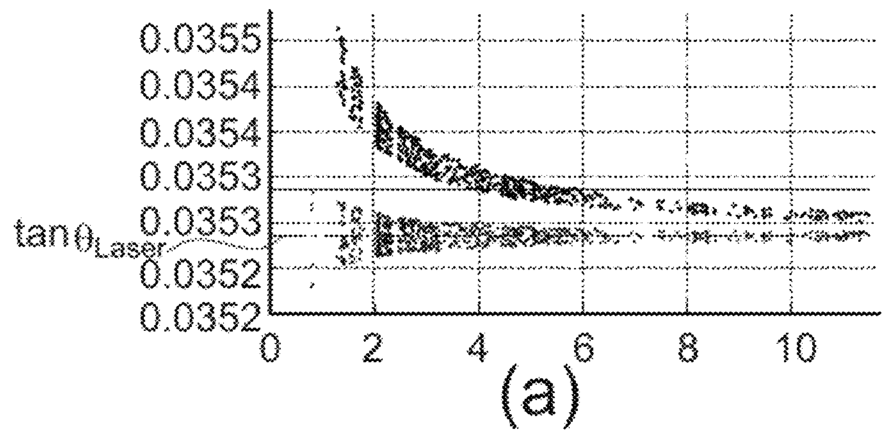
FIG. 12 shows a diagram including points of an example point cloud expressed in the (r, θ) plane after a correction of angle θ has been performed based on characteristics of the beam assembly.
Figure 12:
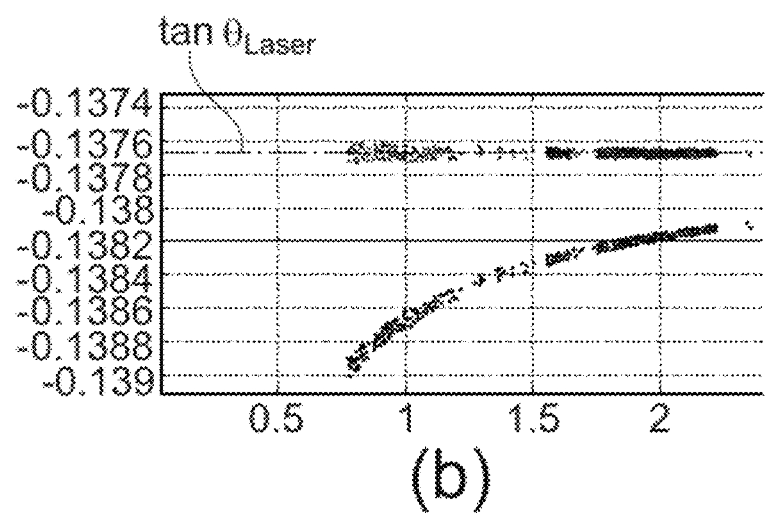

FIG. 12 shows the effect of the vertical correction $z_L$ on the angle θ. Panel (a) corresponds to panel (b) in FIG. 11 and panel (b) corresponds to panel (c) in FIG. 11. The upper envelope in panel (a) and the lower envelope in panel (b) relate to uncorrected (i.e., initial) angles θ. The lower envelope in panel (a) and the upper envelope in panel (b) relate to corrected angles $\theta_{corr}$. As can be clearly seen, the corrected angles exhibit a mean constant behavior substantially independent on the distance r. The angle $\theta_L$ of the respective beam or beam emitter L is defined as this constant.

To enable a correction of angles θ both at the encoder side and the decoder side, the following values may be determined by or provided to the encoder, and encoded into the bitstream such that the decoding process can use the same beam assembly information as the encoding process:

1. the reference location of the beam assembly, such as the LiDAR's head position ($x_{Lidar}$, $y_{Lidar}$, $z_{Lidar}$), for example
2. the relative position ($r_L$ $z_L$) for each beam emitter
3. the constant angle $\theta_L$ for each beam emitter Examples of syntax elements describing characteristics of the beam assembly or beam assemblies that have been used for acquiring point clouds that are to be coded will be described in more details below.

As an example, the reference location of the beam assembly may be provided by a user, and the relative positions and corrected angles of the beam emitters of the beam assembly may be found algorithmically. In one example, this may be performed as follows:

1. First, by analyzing the histogram of non-corrected angles $\theta$, points belonging to a same laser beam L are extracted.
2. Then, the relative position ($r_L$ $z_L$) of the laser beam L is determined by minimizing the standard deviation of the corrected angles $\theta_{corr,L}$ over the extracted points. This can be performed by a classical minimization algorithm, for example. In case only the vertical shift $z_L$ is considered, this is a simple minimization on an interval of candidate vertical relative positions.
3. Finally, the constant angle $\theta_L$ of the laser L is the mean value of the corrected angles $\theta_{corr,L}$ over the extracted points.

As will be appreciated, if a node corresponds to a volume which can be intersected by more than one laser beam, it becomes unclear which laser beam was used to acquire points within the node. This introduces the concept of eligibility of a node for angular coding.

In one example, the angular eligibility of a volume (or its associated node) is determined as follows:

1. Compute the distance r of the center of the node from the reference location of the beam assembly.
2. Compute $\Delta\theta=E/r$, where E is the length of an edge of the cube (or the vertical size of a volume of any shape) associated with the node.
3. The node is eligible if $K\Delta\theta<\Delta\theta_{min}=\min|\tan(\theta_{Li})-\tan(\theta_{Li+1})|$ where the minimum is taken for all adjacent beam pairs. This ensures that the angular size of the node is smaller than the angular delta between the angularly closest two beams. The factor K is used to provide a security margin. In at least some embodiments, the value of K is 2.

Figure 13:
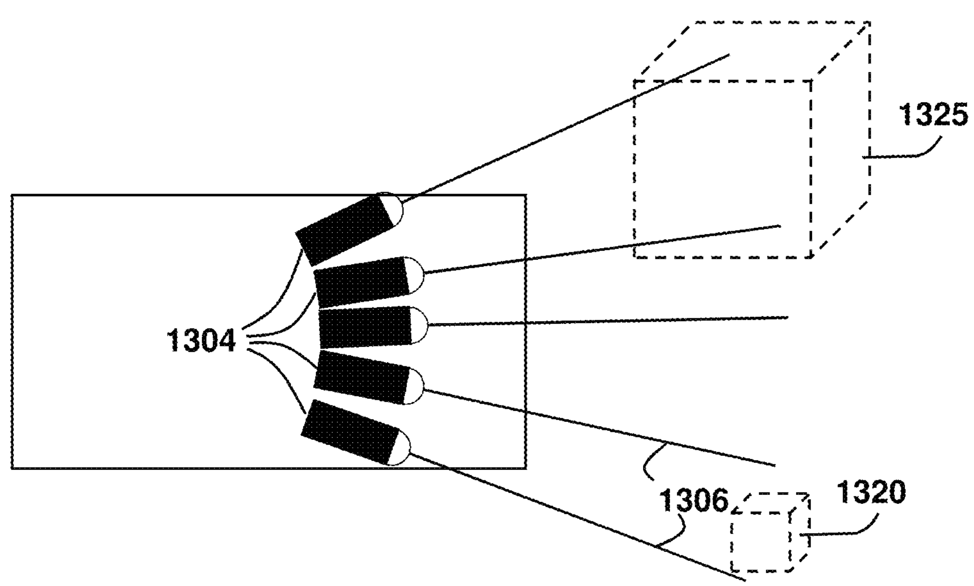
FIG. 13 shows examples of angular sizes of volumes of point cloud data relative to angle differences between beams emitted by the beam assembly.

FIG. 13 shows examples of an angular eligible volume and a volume that is not angular eligible. Namely, the size of volume 1325 and its distance from the beam assembly 1301 is such that it is sampled by multiple beams 1306 from multiple beam emitters 1304. On the other hand, the size of volume 1320 and its distance from the beam assembly is such that it is at most sampled by a single beam 1306.

In general, determining angular eligibility of a volume (or its associated node) may proceed by first determining a measure of an angular size of the volume as seen from a reference location of the beam assembly. The reference location may be the head's location, as noted above. The measure of angular size may relate to an angle under which an edge of the volume is seen from the reference location, and may be determined, for example, based on a length of the edge of the volume and a distance of (the reference location of) the volume to the reference location of the beam assembly. As such, the measure of angular size may be the angular size $\Delta\theta$ defined above, for example. Then, the measure of the angular size is compared to a measure of a difference angle between adjacent beams of the beam assembly, such as the difference angle $\Delta\theta_{min}$ defined above. That is, the difference angle may be the difference angle between the closest adjacent beams of the beam assembly. Finally, it is determined whether or not the volume is angular eligible based on a result of the comparison. For instance, determining angular eligibility may be based on whether the angular size is smaller than half the difference angle (or any other suitable fraction of the difference angle, to provide for a suitable safety margin).

Once angular eligibility has been determined, the beam L to which an angular eligible volume belongs can be determined, for example, by the following approach:

1. determine, from the position (x,y,z) of the reference location of the volume (e.g., the center of the volume), z and r relative to the beam assembly's position ($x_{Lidar}$, $y_{Lidar}$, $z_{Lidar}$)
2. compute the non-corrected angle $\tan(\theta)=z/r$ $$\tan\theta=(z-z_{Lidar})/\sqrt{(x-x_{Lidar})^2+(y-y_{Lidar})^2}$$

3. determine which beam L the volume belongs to by finding the beam index L for which $|\tan(\theta)-\tan(\theta_L)|$ is minimum Once the beam L has been determined, the corrected angle may be computed by the formula of equation 4.

$$\tan\theta_{corr,L}=\frac{z-z_{Lidar}-z_L}{\left(\sqrt{(x-x_{Lidar})^2+(y-y_{Lidar})^2}-r_L\right)} \quad (4)$$

or equation 5:

$$\tan\theta_{corr,L}\approx(z-z_{Lidar}-z_L)/\sqrt{(x-x_{Lidar})^2+(y-y_{Lidar})^2}=\tan\theta-z_L/r \quad (5)$$

The second equality may be practically useful as it avoids computing another inverse square root.

In general, the following approach may be followed for determining the corrected angle $\theta_{corr}$ for a volume associated with a node. Initially, a first angle (e.g., elevation angle) is determined for a reference location within the volume, relative to a reference location of the beam assembly. The reference location within the volume may be the center of the volume, for example. The reference location of the beam assembly may be the center location of the beam assembly, for example. Based on the first elevation angle, a specific beam (or the corresponding beam emitter) L that is assumed to have acquired (or that has actually acquired) the points within the volume is determined. Next, an origin location (beam origin location) for that specific beam is determined or acquired. This may be done by any suitable approach described above. Having available the origin location of the specific beam, corrected elevation angles for sub-volumes or groups of sub-volumes (e.g., planes within the volume) can be determined relative to the origin location for the specific beam.

Angular Coding Mode

The angular coding mode has been introduced to profit from the characteristics of LiDAR-acquired point and obtain gains of compression. It may be used to enhance or replace the predictive information of the planeZPosition discussed above, by using the knowledge of $\tan(\theta_{corr,L})$ for angular eligible nodes.

Specifically, the angular coding mode uses angular information to select a context for improved compression. One method of angular coding is illustrated with respect to FIG. 14.

Figure 14:
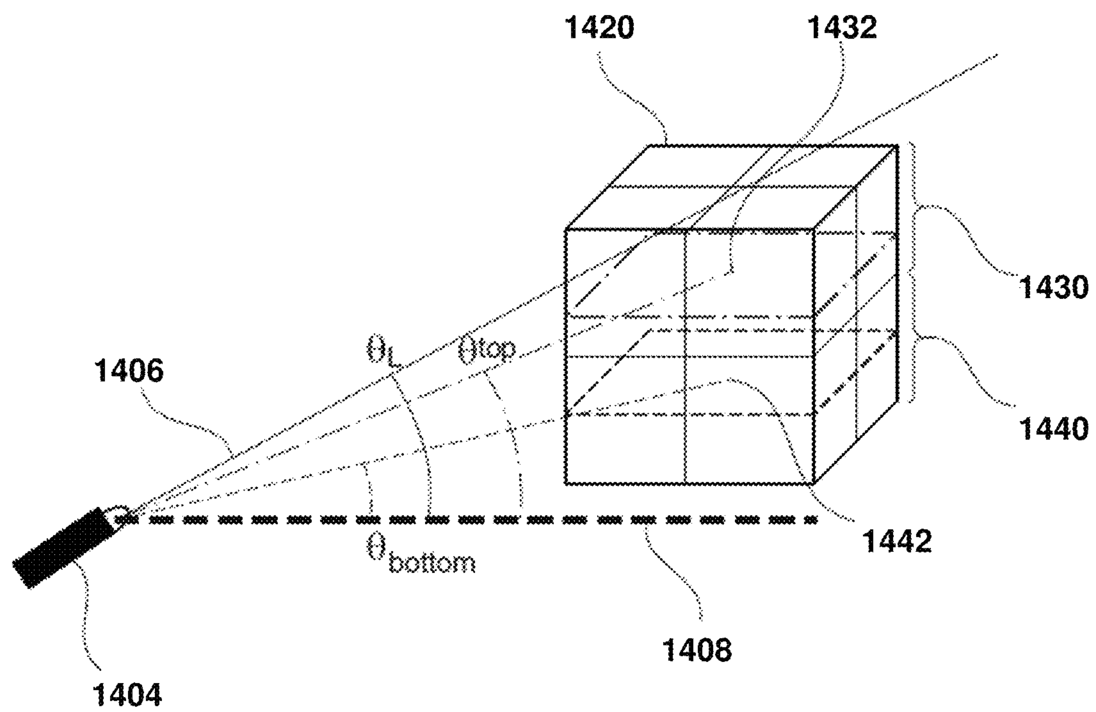
FIG. 14 shows examples of angles of groups of sub-volumes of a volume of point cloud data relative to a beam emitter.

As seen in FIG. 14, an eligible node 1420 is divided in a top horizontal plane 1430 and a bottom horizontal plane 1440, comprising the volume of the top four child nodes and the volume of the bottom four child nodes, respectively. At the middle of each of the top horizontal plane 1430 and the bottom horizontal plane 1440 are virtual planes 1432 and 1442. Top virtual plane and bottom virtual plane do not occupy the full volume of the child nodes, but are instead mere two-dimensional surfaces positioned at the middle of the child nodes.

Angles $\theta_{top,L}$ and $\theta_{bottom,L}$ are defined respectively as the corrected angles from a beam 1406 emitted by laser 1404 to the centers of the top virtual plane and the bottom virtual planes, respective to horizontal plane 1408. The angle $\theta_L$ is the corrected angle for the laser L that is assumed to have acquired (or that has actually acquired) the points within the eligible node. Corrected angles are understood as angles respective to the horizontal plane 1408 passing by location of the beam emitter possibly corrected from the reference location of the beam assembly by $z_L$ and or $r_L$. In some embodiments, the uncorrected angle may be used, however that may lead to worst compression results. Uncorrected angles are understood as angles respective to the horizontal plane 1408 passing by the reference location of the beam assembly. A context may then be determined from these angles, as described below.

The context is determined based on the following conditions:

1. Do $\Delta_{top}=\tan(\theta_L)-\tan(\theta_{top,L})$ and $\Delta_{bottom}=\tan(\theta_L)-\tan(\theta_{bottom,L})$ have the same sign?
2. Which of $|\Delta_{top}|$ and $|\Delta_{bottom}|$ is greater?
3. In what range is the value of $D=||\Delta_{top}|\Delta_{bottom}||/r$, where r is the distance between the laser and the eligible node in the horizontal plane? According to at least one embodiment, four different ranges can be used to select a context, for example, values less than 0.5, values between 0.5 and 1, between 1 and 1.5, or greater than 1.5.

From the above, condition 1 allows for two possibilities, condition 2 allows two possibilities, and condition 3 allows for four possibilities. Therefore, the angular context may take one of 2×2×4=16 possible values.

The angular context determined as described above may be used independently or in combination with a planar context to select a context for the entropy encoder (or decoder).

Predicted-Point Trees

Figure 15:
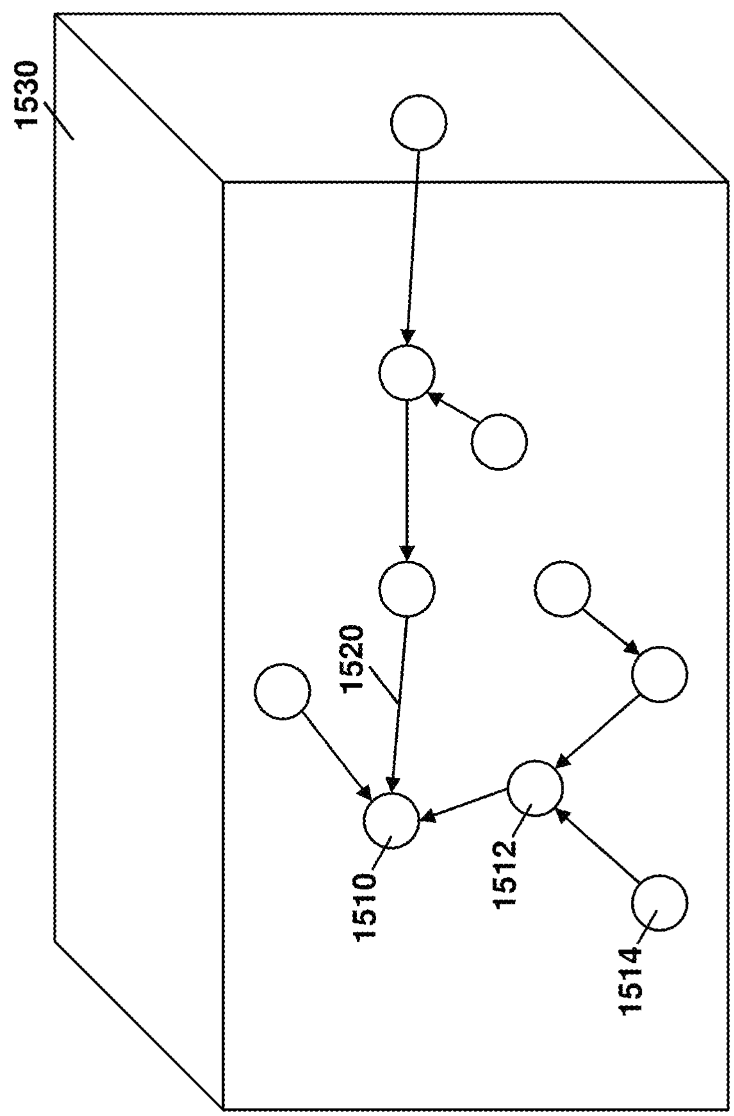
FIG. 15 shows an example predicted-point tree.

A predicted-point tree is illustrated in FIG. 15. Each node of the tree is illustrated by a circle, for example nodes 1510, 1512 and 1514, and is associated with a point of the point cloud. Each arrow 1520 corresponds to a predictive branch of the tree. The tip of the arrow indicates the parent node of the node. Node 1510 is the root node of the tree as it has no parent node. Node 1512 is an internal node of the tree, as it has a parent and at least one child. Node 1514 is a leaf node, as it has no child.

Points associated with the nodes of the predicted-point tree belong to a part of the point cloud, the part being contained in a volume 1530. The structure of the predicted-point tree is determined by the encoding process such as to typically obtain an optimal structure in term of maximum compression of the geometry of the part of the point cloud.

The coordinates (x,y,z) of a point associated with a node of the predicted-point tree are coded using the predicted-point tree coding structure by first determining predicting coordinates $(x_p,y_p,z_p)$ obtained from at least one point associated with an ancestor (parent, grand-parent, etc.) node or a sibling node of the node, then subtracting the predicting coordinates to the coordinates to obtain residual coordinates, and finally coding the residual coordinates. Residual coordinates may be coded using an entropy coder.

Predicting coordinates $(x_p,y_p,z_p)$ are obtained for instance using a linear combination of the coordinates of points associated with ancestor and/or sibling nodes. The coefficients of the linear combination may be selected from a set of possible linear combinations, and a selection index may be signaled. For instance, if p0 is the coordinate of the point associated with the parent node, p1 is the coordinate of the point associated with the grand-parent node and p2 is the coordinate of the point associated with the grand-grand-parent node, possible linear combinations to obtain predicting coordinate may be: 0*p0+0*p1+0*p2 (No prediction); 1*p0+0*p1+0*p2 (Delta prediction); 2*p0−1*p1+0*p2 (Linear prediction); or 2*p0+1*p1−1*p2 (Parallelogram predictor).

The point associated with the root node, herein called root point, cannot be coded using any predicting coordinate (or equivalently can be coded only using the No Prediction mode) and its coordinates are coded directly relatively to the volume 1530.

A Golomb Rice coding, an exp-Golomb coding, or another variable length coding approach, can be used as an entropy coder for coding the residual coordinates. Alternatively, contextual arithmetic coding can also be used. Parameters of the entropy coder can be chosen depending on the index of the linear combination or the distance between the ancestors: e.g. average distance between parent vs grand-parent and grand-parent vs grand-grand-parent.

The construction by the encoder of a predicted-point tree for a set of points may be performed as follows. In one embodiment, the encoder first selects one point from the set of points to be associated with the root node point of the predicted-point tree. This single root node is first considered as a leaf node because it has no child node yet. The selected point is removed from the set of points. Then, the encoder recursively selects a point from the set of points, associates the selected point with a node of the predicted-point tree being constructed, and removes the selected point from the set of points. The recursive process stops when the set of points becomes empty.

In a variant, the encoder first identifies clusters of points and builds a predicted-point trees for each cluster of points by taking the closest point to the center of the cluster as the root point (e.g. point associated with the root node) and associating the other points of the cluster as its children. Then, the set of root points is considered as a new set of points to be clustered, and the process is applied recursively until the set of root points contains only one point. This variant is a bottom-up process that constructs the tree from the leaf nodes up to the root node.

The predictive structure of a predicted-point tree is entirely determined by the prediction selection index associated with each node and the number of child nodes for each node. Points coordinate can then be obtained by the decoder from the predictive structure and the residual coordinates of each point. Thus, a bitstream signaling a predicted-point tree is composed of the number of child nodes per node, the prediction selection index and the residual coordinates for each node.

The scanning order of the tree may be performed following a predetermined coding order. For example, the scanning order of the predicted-point tree may be performed following a depth-first traversal of the nodes. In another example, the scanning order of the predicted-point tree may be following a breadth-first traversal of the nodes.

In a variant, the number N of child nodes for a node is less or equal to a maximum bound N_child_nodes. The number N may be coded in the bitstream for each node, knowing the maximum bound, using a Golomb Rice coding for instance. The maximum bound may be also coded in the bitstream.

In another variant, the number of points being associated with child nodes of a node is fixed or deduced algorithmically from information available to the decoder. In such a case, there is no need to signal the number of child nodes for the node.

Figure 16:
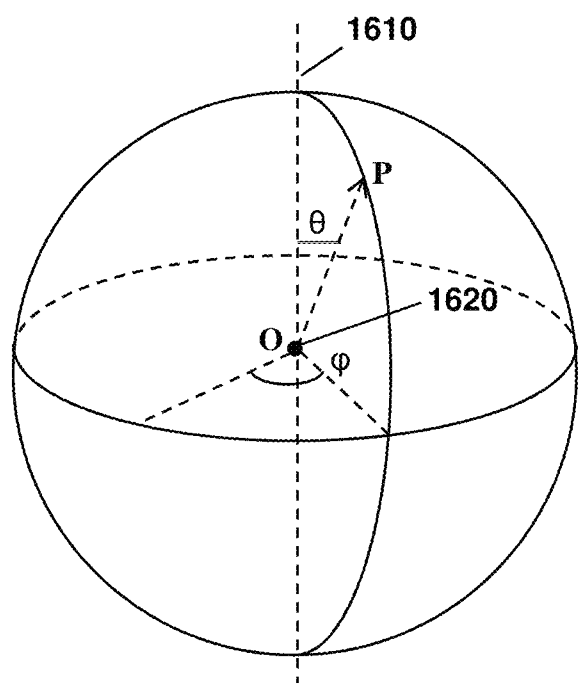
FIG. 16 shows an illustration of spherical coordinates, azimuthal angle φ and elevation angle θ.

Azimuthal Angles p Azimuthal angle φ and elevation angle θ are defined as shown in FIG. 16. In particular, if the main axis of the rotating LiDAR head is the vertical axis 1610, then the elevation angle θ may be defined as zero for a point "P" at the vertical of "O", shown as point 1620 (i.e. 0 is the angle between the vertical axis line and the line [OP]), or alternatively 0 may be defined as zero for points belonging to the horizontal plane passing by "O" (i.e. 0 is the angle between the horizontal plane passing by "O" and the line crossing [OP]). In the latter case, it is common to call the angle θ as the altitude angle.

Typically, a rotating head of the LiDAR probes points one by one, for example from the highest laser beam to a lowest laser beam, at a somewhat constant rate, while the head rotates continuously. For example, reference is now made to FIG. 17.

Figure 17:
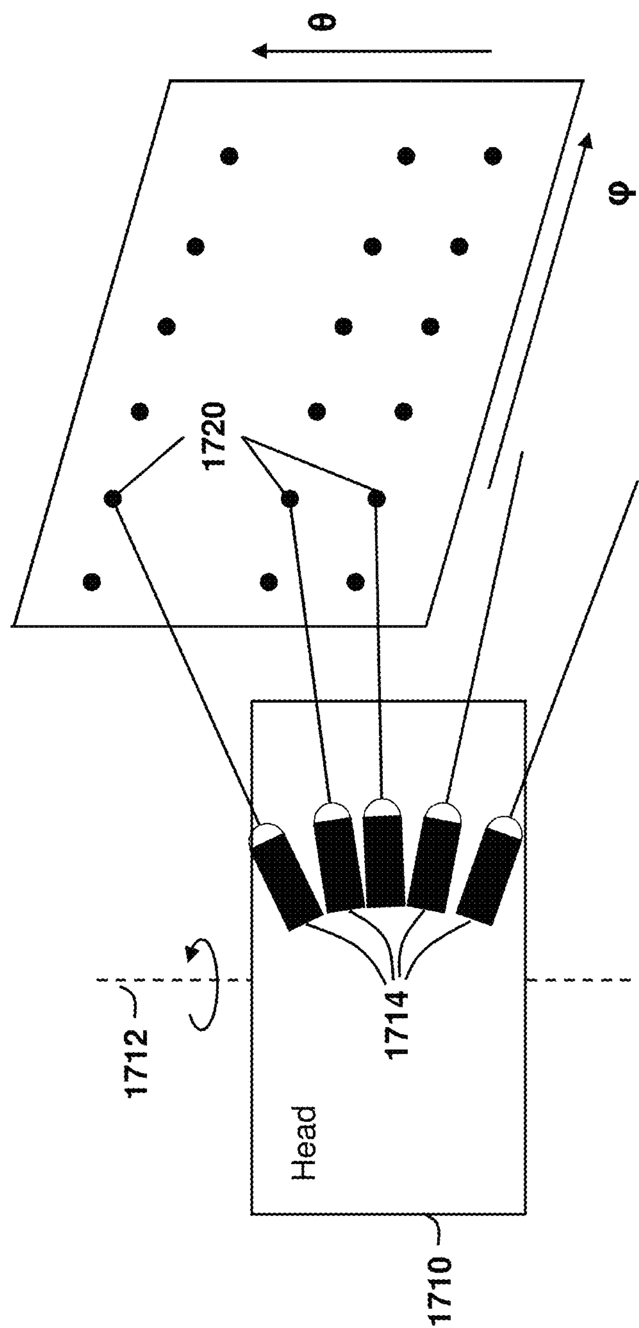
FIG. 17 shows the sensing of a point by a rotating LiDAR head.

In the embodiment of FIG. 17, a LiDAR head 1710 rotates along axis 1712. A plurality of lasers 1714 may sense a plurality of points 1720.

Figure 18:
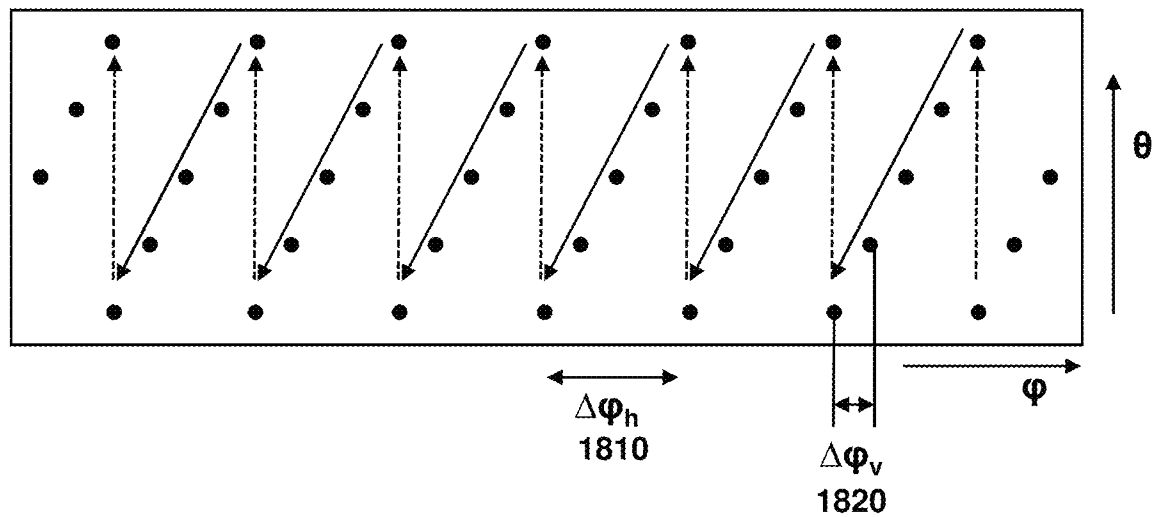
FIG. 18 shows a typical scanning order by rotating LiDAR head.

Because the head is moving, the scanning order follows the embodiment of FIG. 18 in the (φ, θ) angular plane. Due to the continuous and smooth rotation of the head, as well as the constant rate of acquiring points, the azimuthal angular distance between the acquired points is constant.

Therefore, as seen in FIG. 18, the horizontal azimuthal distance Δφh 1810 between two points probed by a same laser is constant, up to some unavoidable acquisition of noise and quantization. Also, the azimuthal distance $\Delta\varphi_V$ between two points probed by two adjacent lasers is also constant, as shown by the distance 1820. While this is a horizontal distance, in the present disclosure it is referred to as vertical azimuthal distance since the distance is determined based on two vertically displaced lasers.

Figure 19:
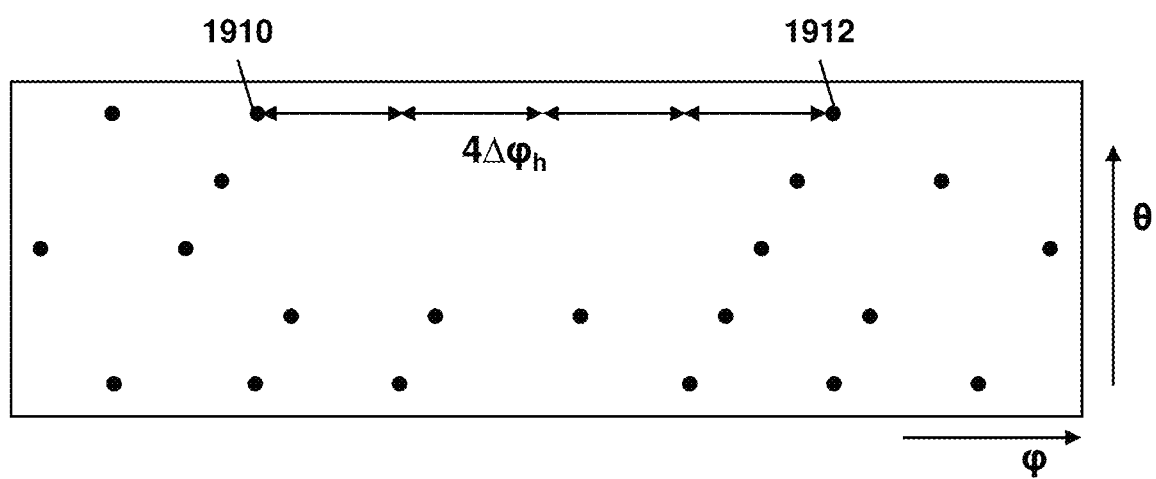
FIG. 19 shows an example scanning of a LiDAR head where some points are not registered, and azimuthal angle priors are essentially multiples of Δφ.

However, the LiDAR does not acquire every point. In particular, the laser misses points regularly because there is no object reflecting the laser. Practically, the azimuthal angular distance between two points is a multiple of elementary shifts Δφh or Δφv, as depicted in FIG. 19. These shifts are known as azimuthal priors.

As seen in FIG. 19, the distance between two points 1910 and 1912 is equal to 4Δφh.

Using the above, one issue is how to obtain better compression of the geometry of a LiDAR acquired point cloud by using azimuthal angular distances between points being multiples of elementary shifts Δφh or Δφv.

Improved Compression Using Azimuthal Priors

In accordance with one embodiment of the present disclosure, azimuthal priors may be used to improve the compression of information representative of the occupancy of a current node in a tree representing the geometry of a point cloud by selecting a context using an entropy coder that codes this information. Such entropy coder may be, for example, a CABAC coder.

Figure 20:
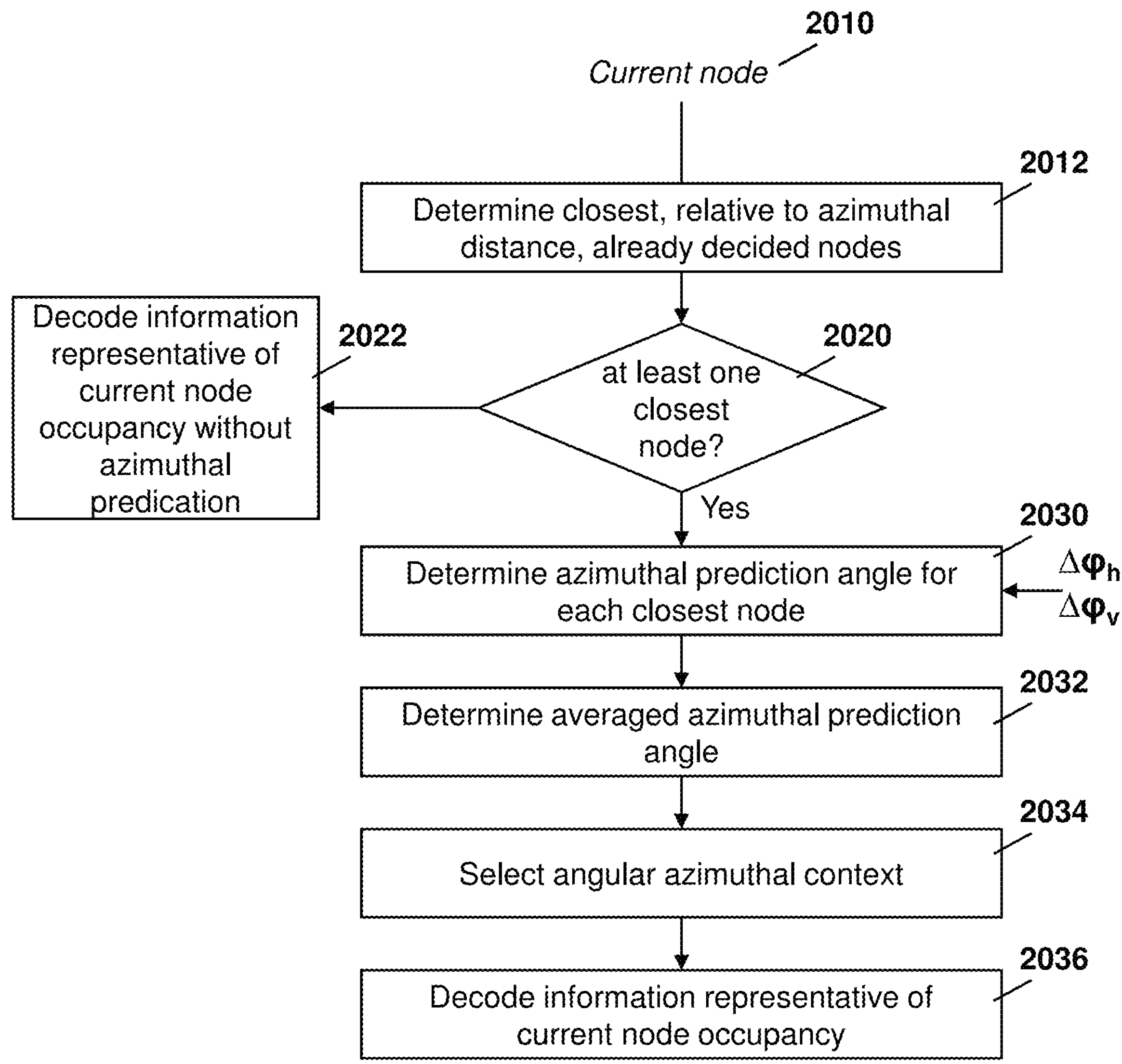
FIG. 20 shows a process diagram for decoding information representative of current node occupancy using and azimuthal prediction angle.

In particular, reference is now made to FIG. 20. In the embodiment of FIG. 20, at a current node 2010, the process proceeds to block 2012 in which a decoder determines the closest, relative to azimuthal distance, already decoded nodes.

The process then proceeds to block 2020 in which a determination is made of whether at least one closest node exists. If not, the process proceeds to block 2022 in which the information is decoded or encoded based on information representative of the current node occupancy without azimuthal prediction.

If there is at least one closest node, then the process proceeds from block 2020 to block 2030. At block 2030, an azimuthal prediction angle for each closest node is determined with inputs of the elementary shifts Δφh or Δφv.

The process then proceeds to block 2032 in which the averaged azimuthal prediction angle is found. The averaged azimuthal prediction angle is found as described below.

The process then proceeds to block 2034 in which the angular azimuthal context is selected. The context is selected as described below.

The process then proceeds to block 2036 in which information representative of the current node occupancy is decoded utilizing the context information.

The context at block 2034 may be selected based on, in one instance, the location of the current node in the azimuthal plane. For example, this may be the azimuthal angle associated with a set of child nodes. The context may further be selected based on an azimuthal prediction angle determined from the azimuthal angles of the "closest" already coded nodes.

Basically, the azimuthal prediction and the location of the current node are compared to anticipate which subset of nodes is likely to be occupied, and the adequate context is therefore selected.

The determination of the averaged azimuthal prediction angle is essentially obtained from the azimuthal angles associated with the closest already coded nodes by shifting these angles by adequate multiples of the elementary shifts Δφh and/or Δφv, and then the shifted angles are averaged to obtain a unique averaged azimuthal prediction angle.

Details of the above are described below.

Azimuthal Angle Prediction

In one embodiment, prediction azimuthal angles may be constructed based on angles associated with already coded nodes. For example, an azimuthal angle $\varphi_c$ is associated with each already coded node whose center of the associated volume, such as a cuboid, is located at coordinates ($x_c$, $y_c$, $z_c$). This azimuthal angle may be determined by inverse trigonometric functions, for instance in accordance with the equation 6 below.

$$\varphi_c = \text{atan }2(y_c, x_c) = \text{atan}(x_c/y_c) \quad (6)$$

In alternative embodiments, the angle may be determined through other trigonometric formulae, such as equations 7 and 8 below.

$$\varphi_c = \text{asin}(y_c/r_c) \quad (7)$$

$$\varphi_c = \text{acos}(x_c/r_c) \quad (8)$$

In equations 7 and 8 above, $r_c$ is the azimuthal radius such that $r^2 = x_c^2 + y_c^2$. Practically, these inverse trigonometric functions may be approximated to obtain a fast implementation. For example, these functions may be approximated using low order polynomials by recursive methods such as the Coordinate Rotation Digital Computer (CORDIC) algorithm. In some cases, these approximations may be implemented in fixed point in order to obtain faster and hardware-friendly implementations.

In some cases, in order to simplify even further, the use of trigonometric functions may be avoided by using the coordinate ratios instead of azimuthal angles in some implementations. For example, using the notation of equation 9 below one may use priors in the w-space instead of the w-space.

$$\varphi_c = \text{atan}(x_c/y_c) = \text{atan}(\Psi_c) \quad (9)$$

However, an adjustment of the elementary shifts may be needed, and may generally be found using a first order approximation such as that shown in equation 10 below.

$$\varphi_c + n\Delta\varphi_h = a\tan(\Psi_c + \Delta h) \approx a\tan(\Psi_c) + \Delta h\, a\tan'(\Psi_c) = \varphi_c + \frac{\Delta h}{1+\Psi_c^2} \quad (10)$$

Using equation 10 above, one obtains an adjustment shift in accordance with equation 11.

$$\Delta h = n\Delta\varphi_h(1+\Psi_c^2) \quad (11)$$

In equation 11 above, n is an integer that indicates the multiple of the elementary shifts to be applied. Hereafter, the embodiments described are detailed in the φ-space, but this is merely provided for illustration purposes, and the embodiments may be generalized through the first order approximations above, to the ψ-spaces, with ψ being equal to $x_c/y_c$, $y_c/r_c$, and $x_c/r_c$.

Figure 21:
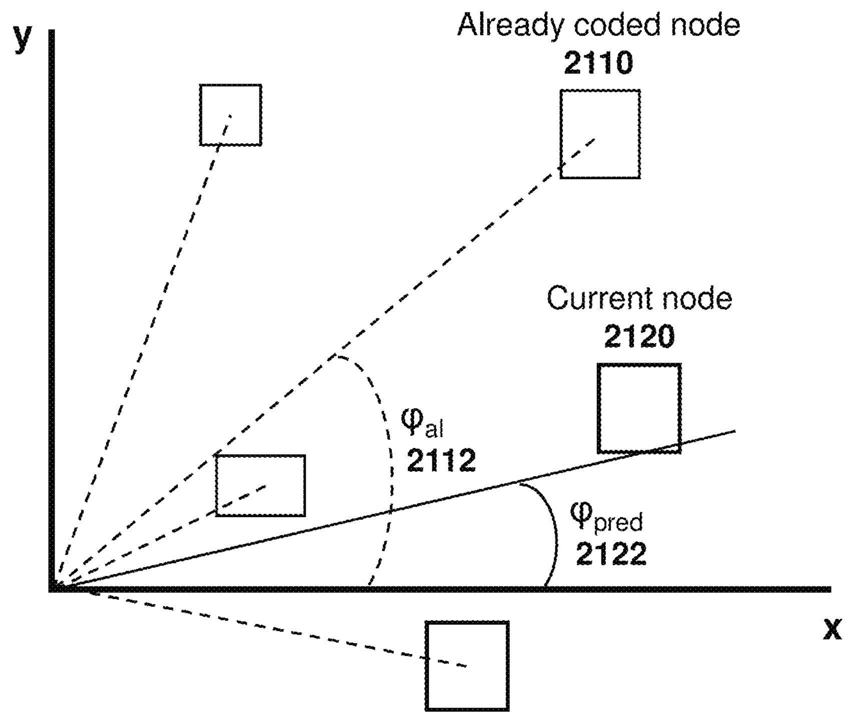
FIG. 21 shows a construction of an averaged prediction angle $\varphi_{pred}$.

Referring to FIG. 21 and based on the above, a current node 2120 with azimuthal angle $\varphi_{cur}$ may be considered against an already coded node 2110 with azimuthal angle $\varphi_{al}$ 2112. These two nodes may have associated volumes with different shapes and sizes. If $L_{cur}$ is the beam index that acquires points in the current volume, and $L_{al}$ is the beam index that acquires points in the already coded volume, then the azimuthal angle of the already coded volume is shifted as follows to obtain the prediction azimuthal angle associated with the already coded node.

1. if $L_{cur}$ and $L_{al}$ are different, then $\varphi_{al}$ is shifted by an elementary vertical shift $\Delta\varphi_v$ between the two lasers to obtain $\varphi'_{al}$.
2. $\varphi'_{al}$ may be shifted by n times the elementary horizontal shift $\Delta\varphi_h$, n being a positive or negative integer, such that the resulting angle $\varphi''_{al}$ belongs to the interval $[\varphi_{cur}-\Delta\varphi_h/2, \varphi_{cur}+\Delta\varphi_h/2]$.

The resulting angle $\varphi''_{al}$ is the prediction azimuthal angle 2122, for the current node, associated with the already coded node.

Further, in some embodiments, it may be desirable to combine several prediction angles into an average prediction. In this regard, in accordance with a further embodiment, all coded nodes can potentially lead to a prediction azimuthal angle for the current node. One or more already coded nodes may be used to predict the angle of the current node. The associated prediction azimuthal angles are averaged to obtain a unique averaged azimuthal prediction angle.

However, not all prediction azimuthal angles have the same "quality". For example, quality may refer to whether the nodes have the same capability of accurately predicting the azimuthal angles of the occupied child nodes or points belonging to the current node. Already coded nodes azimuthally far from the current node require a shift of $n\Delta\varphi_h$, with a large n, thus amplifying the inaccuracy of $\Delta\varphi_h$.

Also, already coded nodes having a large size have a high uncertainty on the azimuthal angles associated with the points they encompass. For these reasons, already coded nodes used for the prediction azimuthal angles of the current node are selected among:

1. already coded nodes smaller in size than the current node;
2. sufficiently azimuthally close to the current node, for example such that the absolute value of $\varphi_{al}-\varphi_{cur}$ is lower than a given threshold;
3. optionally, the already coded node is probed by the same laser as the current node. In this case, the inter-laser vertical elementary shift $\Delta\varphi_v$ is not used.

Depending on the scanning order of the nodes in the tree, the order may be depth-first or breadth-first, and use IDCM nodes to prune the tree. Various sizes of already coded nodes may be available. The capability of accurately predicting azimuthal angles may be determined as follows. If s is the size of an already coded node, the azimuthal angle $\varphi_{al}=\text{atan}(x_{al}/y_{al})$ is prone to an error of order "s" on both $x_{al}$ and $y_{al}$ such that the ratio $x_{al}/y_{al}$, as well as the angle, at first order in s is shown by equation 12 below.

$$\frac{x_{al}+s}{y_{al}+s} \approx \left(\frac{x_{al}}{y_{al}}\right)\left(1+\frac{s}{x_{al}}-\frac{s}{y_{al}}\right) \quad (12)$$

Equation 12 is prone to an error of order $e_{al}=s/\min(|x_{al}|, |y_{al}|)$. By using this error estimator $e_{al}$, one may qualify the quality associated with a prediction azimuthal angle $\varphi''_{al}$. Angles with a higher quality such as those with the lower order $e_{al}$, may have a higher weight in the weighted sum leading to the average prediction angle $\varphi_{pred}$ in accordance with the equation 13 below.

$$\varphi_{pred} = \sum_{\substack{\text{already coded}\\ \text{nodes}}} \frac{\varphi''_{al}}{e_{al}} \Big/ \sum_{\substack{\text{already coded}\\ \text{nodes}}} \frac{1}{e_{al}} \quad (13)$$

In case no error estimation is performed, one may take all errors $e_{al}$ as having the same amplitude, and the averages prediction angle is obtained by a non-weighted sum.

Figure 22:
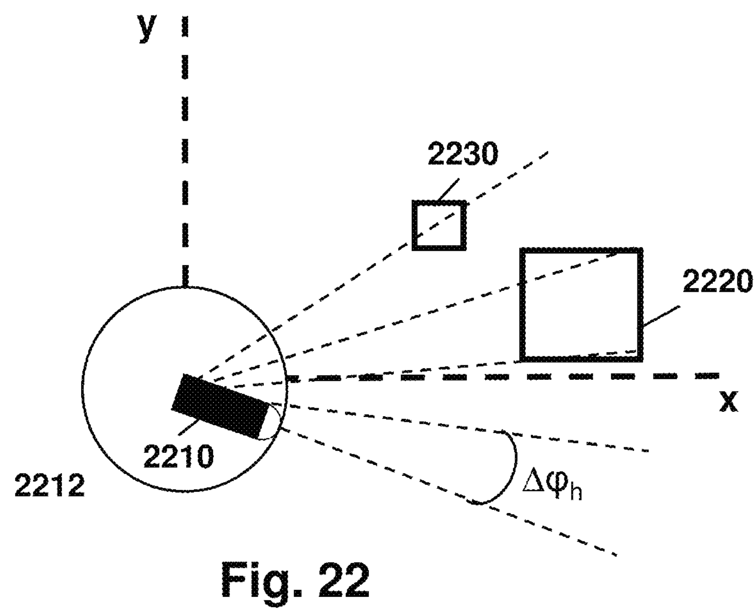
FIG. 22 shows an illustration for establishing the eligibility of a node for azimuthal coding.

Further, in some embodiments, nodes may not be eligible for azimuthal coding. Reference is now made to FIG. 22. In the embodiment of FIG. 22, a single laser 2210 is rotating about an axis 2212. As described above, the angle between the readings is $\Delta\varphi_h$.

A not eligible node 2220 is shown, along with an eligible node 2230.

Eligible node 2230 is eligible because it is intersected by at most one laser. This is the angular eligibility described above.

Further, eligible node 2230 is eligible because it is small enough to ensure that it is not probed twice by the at most one laser. This is equivalent to saying that the azimuthal angle section is smaller than the elementary shift $\Delta\varphi_h$ as depicted in the embodiment of FIG. 22. Basically, the azimuthal eligibility is fulfilled when the inequality $r\Delta\varphi_h > E$ holds, where E is the length of the longest edge of the cuboid associated with the node.

Context Determination for an Entropy Coder from Azimuthal Angle Prediction; Planar Mode Embodiments Vertical Planar Mode In accordance with planar mode coding as described above, it has been observed that coding directly the planar information without compression leads to a very inefficient planar mode. Therefore, compressing the syntax associated with the planar mode is needed. In particular, a bit, referred to as planePosition, is compressed by selecting a context for the binary entropy coder based on a prediction method.

Figure 23:
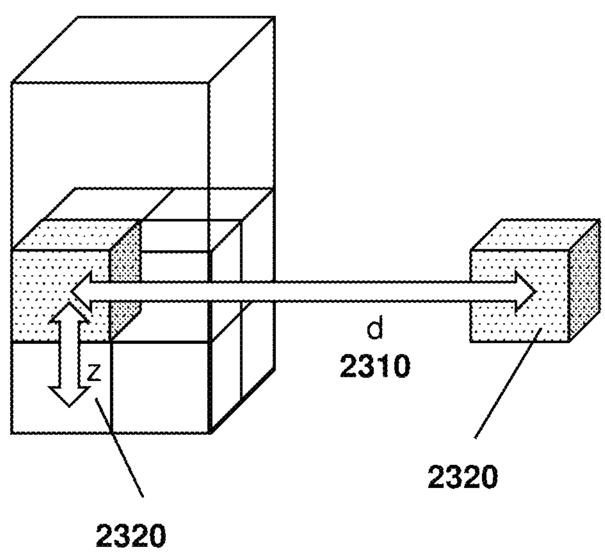
FIG. 23 shows an example prediction of the plane position.

For the z-planar mode, if the node is planar, such that a flag "isPlanar" is true, the plane position either bottom or top is signaled by an extra bit, referred to as planeZPosition. This bit is also coded using a binary arithmetic coder whose context depends on predictive information. For example, reference is now made to FIG. 23. In the embodiment of FIG. 23, the predictive information is made of the occupancy of the parent node's vertical neighbor adjacent to the current node, a distance d, shown as reference 2310 from the closest already coded node 2312 at the same z 2320 and same depth. The value d is discretized into three values, namely "near" or "not too far" or "far".

The predictive information is further made of the plane position, if any, bottom or top, of the closest already coded node at the same z and same depth as the current node.

The predictive information is further made of the vertical coordinate z of the current node relative to its parent node.

This leads to a 2×3×2×2=24 possible predictive combinations in case the closest already coded node at the same z and the same depth as the current node is planar. Otherwise, when the closest already coded node at the same z and same depth is not planar, and extra specific context is used instead. Thus 24+1=25 contexts are used by the binary arithmetic coder to code the plane position.

The azimuthal priors may provide some useful information to better compress the plane position bits "planeXPosition" and "planeYPosition" for "vertical" planar modes. In accordance with the embodiments herein, predictive information for bits planeXPosition and/or planeYPosition may be enhanced or replaced by using knowledge of the azimuthal angles of already coded nodes to construct an averaged azimuthal predictor, and then to deduce the context by using a binary entropy coder such as CABAC to compress these two bits.

Selection of the Horizontal x and/or y Planar Mode

Figure 24:
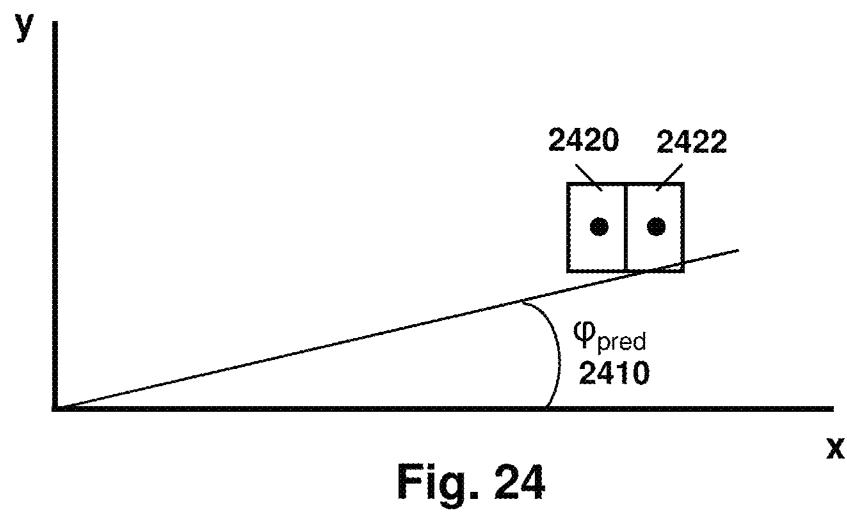
FIG. 24 shows a current node being discriminated by the prediction angle is close to the x axis.

Depending on the position of the projection of the current node in the azimuthal xy plane, the azimuthal angle prediction may predict the x plane position planeXPosition or the y plane position planeYPosition or both, where the prediction may in some cases be better for one plane than the other. As illustrated in FIG. 24, for the x plane position the prediction angle $\varphi_{pred}$ 2410 does not discriminate well the two plane positions (left and right) of the dots 2420 and 2422 within the current node due to the small azimuthal angle. In other words, the nodes are close to the x-axis and thus the angles between dots 2420 and 2422 have small differences.

Figure 25:
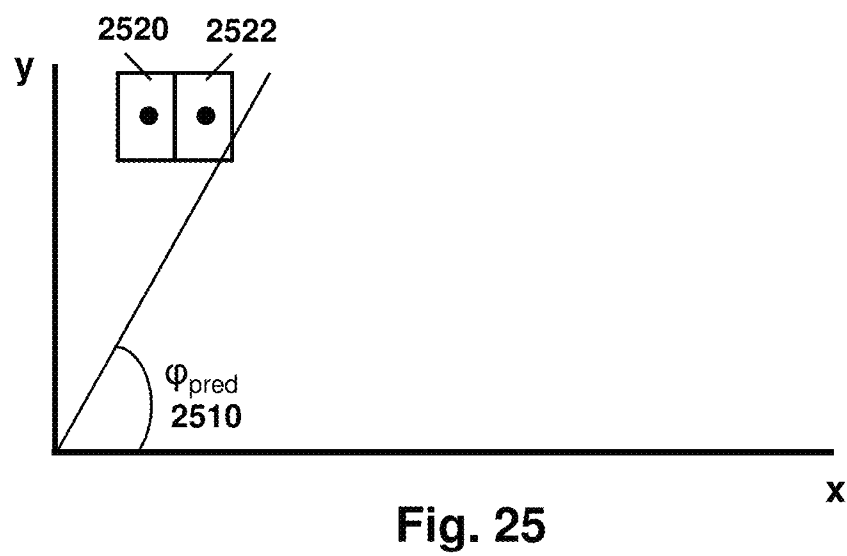
FIG. 25 shows a current node being discriminated by the prediction angle is close to the y axis.

On the other hand, for nodes with azimuthal angles close to 90°, in other words nodes close to the y-axis, the discrimination is maximal. For example, referring to FIG. 25, the angle between dots 2520 and 2522 is maximal since the nodes are close to the y-axis, allowing the prediction angle $\varphi_{pred}$ 2510 to discriminate between the dots.

Therefore, the plane bits planeXPosition and planeYPosition are, or are not, predicted, depending on the position of the current node in the azimuthal plane. For example, one may select the horizontal x and/or y planar modes as follows. If the azimuthal angle of the current node is less than 50° from the x-axis, than the y-plane position planeYPosition is coded using the azimuthal prediction. Otherwise it is not.

In other cases, if the azimuthal angle of the current node is less than 50° from the y-axis, then the x plane position planeXPosition is coded using as the azimuthal prediction, otherwise it is not.

Other values less than 50° may be used in some cases. In this example, the current nodes with azimuthal angles between 40° and 50° may have both x and y plane positions coded using the azimuthal predictions. These nodes would be close to the xy diagonals.

Context Determination

In the embodiment described below, the determination is performed in the context of the x-plane position. The case for the y-plane position would be similar to that described below, with the swapping of the x and y axes and utilizing symmetry.

Figure 26:
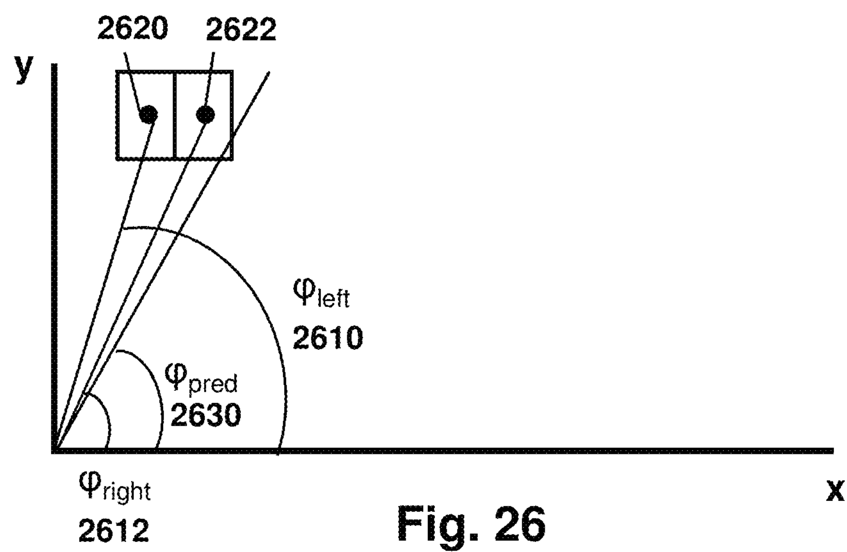
FIG. 26 shows the right and left azimuthal angles of the virtual plains of the x-planar node.

Reference is now made to FIG. 26. For context determination, first, two angles, namely left and right azimuthal angles are computed if the current node is azimuthal eligible. These two angles correspond to the angles $\varphi_{left}$ 2610 and $\varphi_{right}$ 2612 associated with the points 2620 and 2622 located in the center of the vertical planes.

Next, the plane position context is determined using these two angles, as well as the prediction angle $\varphi_{pred}$ 2630 determined as described above. An azimuthal context index is determined from left and right azimuthal angles $\varphi_{left}$ and $\varphi_{right}$ right by computing the context index in accordance with the following. A first bit of the context index depends on whether or not the differences between $\varphi_{pred}-\varphi_{left}$ and $\varphi_{pred}-\varphi_{right}$ have the same sign.

A second bit of the context index depends on which of $|\varphi_{pred}-\varphi_{left}|$ and $|\varphi_{pred}-\varphi_{right}|$ has the highest magnitude.

The context index also depends on the quantization of the difference $D=||\varphi_{pred}-\varphi_{left}|-|\varphi_{pred}-\varphi_{right}||$. The quantization may be performed relative to the inverse radius r associated with the current node center. In other words, the value D*r is quantized.

In pseudocode the determination of the azimuthal context index may be obtained in accordance with Table 1 below.

TABLE 1 pseudocode for azimuthal context determination

```
m = φpred − φleft
M = φpred − φright
context_index = m*M >= 0 ? 1 : 0
m = | m |
M = | M |
context_index += m < M ? 2 : 0
if (m > M) {
  temp = m
  m = M
  M = temp
}
D = M − m
QD = (D*r >= 0.5 ? 1 : 0) + (D*r >= 1 ? 1 : 0) + (D*r >= 1.5 ? 1 : 0)
context_index += 4*QD
```

In this implementation, the quantity D*r is quantized over four values {0, 1, 2, 3} corresponding to the value of D*r being smaller than 0.5, between 0.5 and 1, between 1 and 1.5, or greater than 1.5. Consequently, the azimuthal context index can take 2×2×4=16 values.

Finally, the azimuthal context can either replace the predictive information used in the planar mode context determination or enhance the predictive information to create a new and bigger set of planar/azimuthal contexts.

Figure 27:
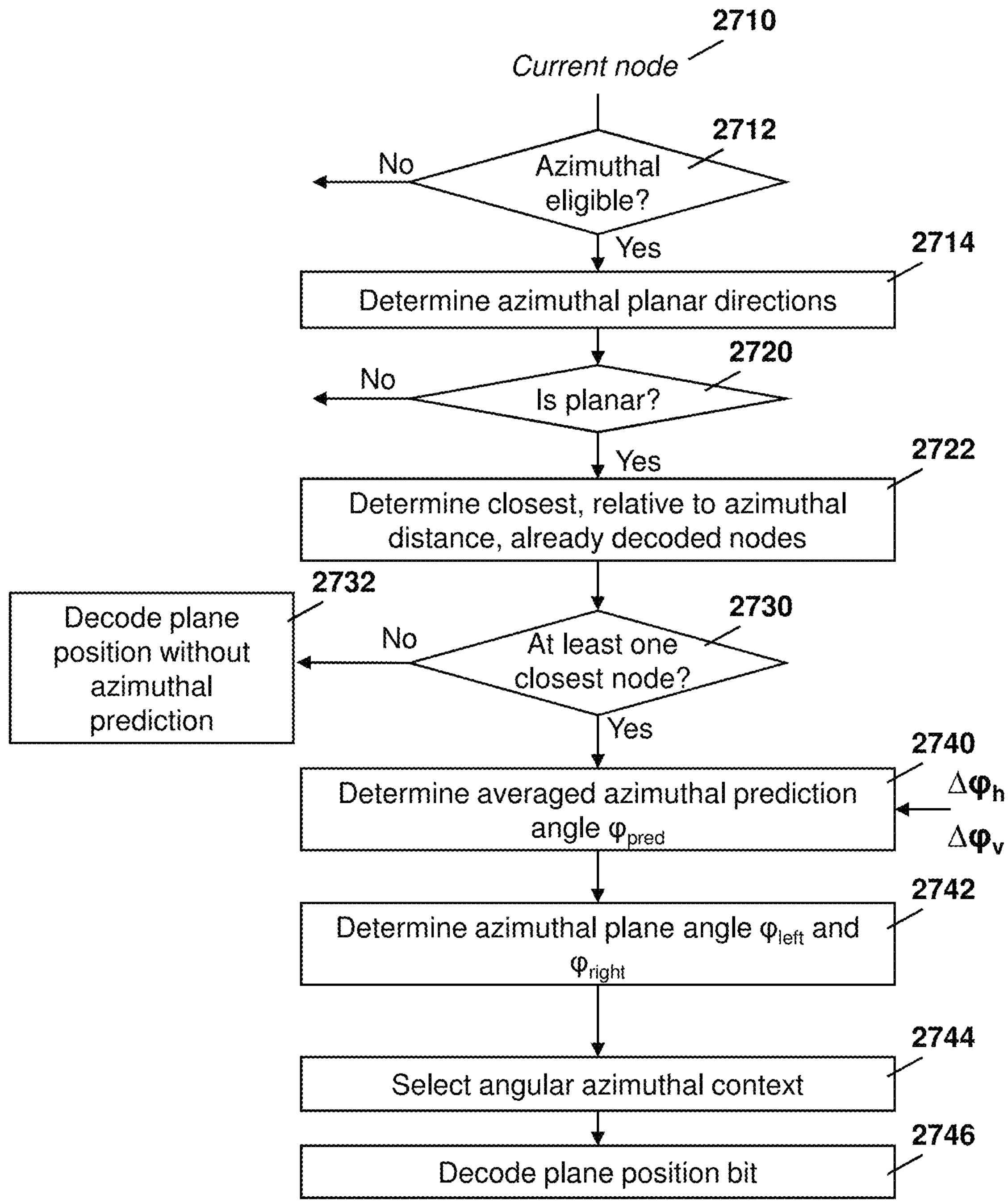
FIG. 27 shows a process diagram for using azimuthal priors to predict the position of the plane in the planar mode.

Reference is now made to FIG. 27, which shows a process diagram for the methods described above for using azimuthal priors to predict the position of the plane in the planar mode.

In particular, for a current node 2710, a check is made at block 2712 to determine whether the node is azimuthal eligible. If not, the process ends.

Otherwise, the process proceeds to block 2714 in which a determination of the azimuthal planar directions is made.

After the determination of the azimuthal planar directions, a check is made to determine whether the node is planar at block 2720. If not, the process ends. Otherwise, the process proceeds from block 2720 to block 2722 in which the closest already decoded nodes, relative to the azimuthal distance, are determined.

From block 2722, the process proceeds to block 2730 in which a check is made to determine whether at least one current closest node has been previously decoded. If not, the process proceeds to block 2732 in which the plane position is decoded without the azimuthal prediction.

From block 2730, if there is at least one closest node, the process proceeds to block 2740 in which the averaged azimuthal prediction angle $\varphi_{pred}$ is determined, utilizing the elementary shifts $\Delta\varphi_h$ and $\Delta\varphi_v$.

From block 2740, the process proceeds to block 2742 in which the azimuthal plane angle $\varphi_{left}$ and $\varphi_{right}$ are determined.

The process then proceeds to block 2744 in which the angular azimuthal context is selected as described above.

From block 2744 the process then proceeds to block 2746 in which the plane position is decoded.

Azimuthal Angular Coding Mode in IDCM Nodes

The above embodiments may be applied to IDCM. For example, in a current node, IDCM may be subject to activation conditions as described above. Basically, these conditions are met when a node is isolated, which is a good prior to anticipate the isolation of subsequent points that can profit from IDCM.

In order to ensure angular consistency in IDCM, such consistency needed to obtain efficient angular coding, an extra condition may be added to the list of conditions for IDCM eligibility. This extra condition may be the double angle eligibility condition described above with regard to FIG. 13 and also with regard to FIG. 22. If this double angular condition is not met, IDCM is not applied to the current node.

Applying the above to LiDAR and assuming that the LiDAR main axis is vertical and parallel to the z axis, once angular IDCM is activated for a current node, the following information may be known. A first piece of known information is the closest laser index L from the volume associated with the current node. A second piece of known information is the direction x and/or y to which azimuthal priors are applied to compress the coordinates x and/or y of the points belonging to the IDCM node.

In the examples below it is assumed that the coordinate x of a point is compressed. However, the case of the coordinate y is similar. For each point, bits of the relative coordinate x of the point are coded iteratively. The relative coordinate is relative to a base point of the volume. For example, such relative point may be a corner of a cuboid volume.

Figure 28:
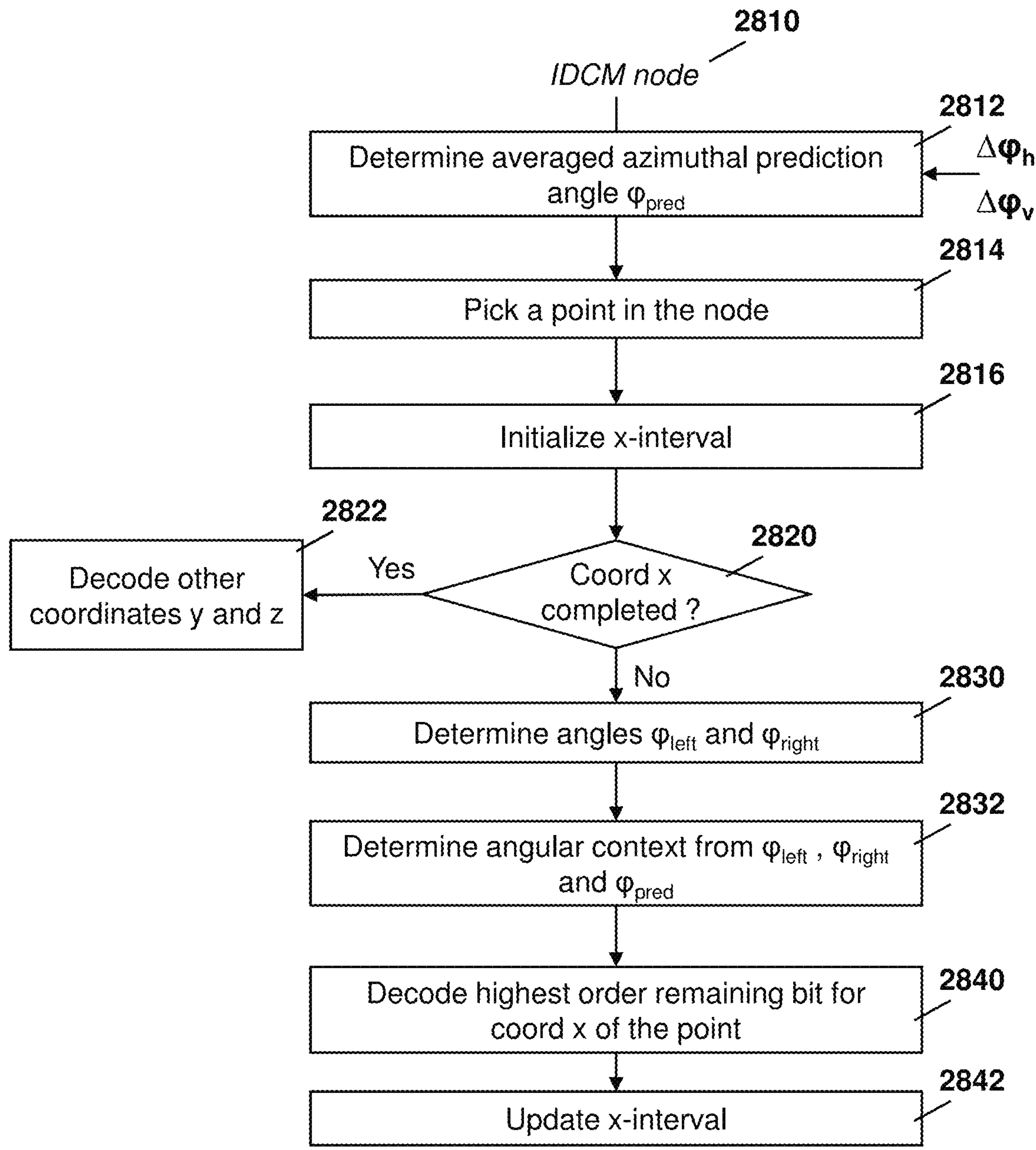
FIG. 28 shows a process diagram for using an azimuthal coding mode into an IDCM mode.

The iterative coding process of the coordinate x is based on a recursive split of an interval to which the coordinate belongs. Reference is now made to FIG. 28.

In the embodiment of FIG. 28, for each IDCM node 2810 the process proceeds to block 2812 in which the average azimuthal prediction angle $\varphi_{pred}$ is determined with inputs $\Delta\varphi_h$ and $\Delta\varphi_v$. Prediction angle $\varphi_{pred}$ is used to code all bits of the coordinate of all points belonging to the IDCM node.

The process then proceeds to block 2814 in which a point is picked in the node. For each point, its relative coordinate x is decoded in accordance with the remaining process. One skilled in the art would appreciate that the including process is very similar.

Figure 29:
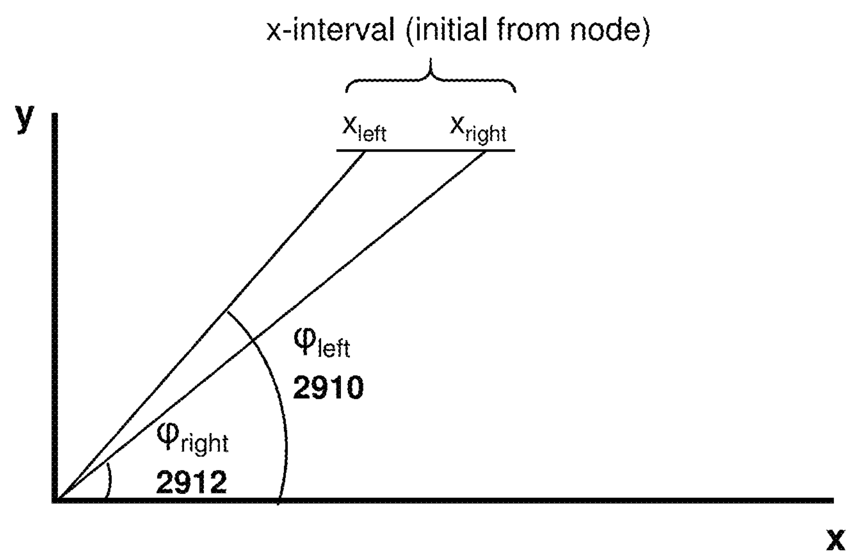
FIG. 29 shows an initial x-interval obtained from a node size along an x direction.

The process then proceeds to block 2816 in which the x-interval is initialized. This is shown, for example, in FIG. 29 in which the x-interval is initialized from the node with an initial $x_{left}$ and an initial $x_{right}$ having the initial azimuthal angle values of $\varphi_{left}$ 2910 and $\varphi_{right}$ 2912.

The initial x-interval, in the azimuthal xy plane, is obtained from the horizontal (along the x axis) location and size of the current node to which IDCM is applied. This initial interval covers exactly all possible values of the coordinate x for the point belonging to the volume associated with the node. The position y of the interval may be taken as the value $y_c$ of the y coordinate of the center of the IDCM node. In a variant, the coordinate $y_p$ of the point is decoded first, before decoding the coordinate x, and the position y of the interval is taken as the decoded coordinate $y_P$ of the point.

Then, the angles of $\varphi_{left}$ 2910 and $\varphi_{right}$ 2912 are computed for the two points $x_{left}$ and $x_{right}$ that are located at ¼ and ¾ of the interval.

Referring again to FIG. 28, from block 2816 the process proceeds to block 2820 in which a check is made to determine whether the coordinate X is completed. If yes then the process proceeds to block 2822 in which the other coordinates, namely coordinates y and z, are decoded.

Conversely, if the coordinate x is not completed then the process proceeds from block 2820 to block 2830 in which the angles $\varphi_{left}$ and $\varphi_{right}$ are determined.

The process then proceeds to block 2832 in which an angular context is determined from $\varphi_{left}$, $\varphi_{right}$ and $\varphi_{pred}$.

The process then proceeds to block 2840 in which the highest order remaining bit for the coordinate x of the point is encoded/decoded. The process then proceeds to block 2842 in which the x-interval is updated.

Figure 30:
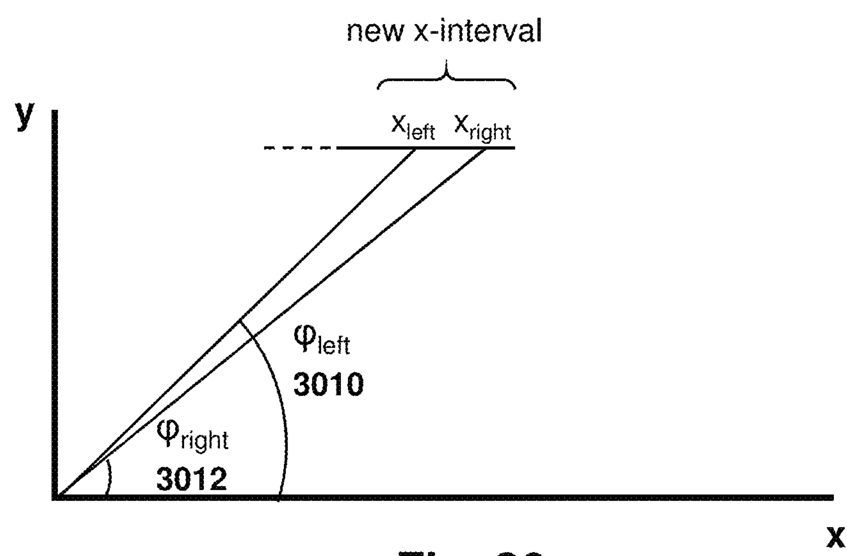
FIG. 30 shows an evolution of the ex-interval after decoding or coding a bit of a coordinate x of the point.

Thus, as described above, an azimuthal context is selected from the knowledge of angles $\varphi_{left}$, $\varphi_{right}$ and $\varphi_{pred}$. Knowing the context, the entropy (de)coder (de)codes the remaining bit of highest order for the coordinate x of the point. As shown in FIG. 30, the x-interval is then updated by using the (de)coded bit. For example, if the bit indicates (e.g. bit is equal to 1) that the coordinate x of the point belongs to the right part of the x-interval, then the new updated x-interval is taken as this right part, whose length has become half. This therefore updates both $\varphi_{left}$ 3010 and $\varphi_{right}$ 3012.

Determining angles $\varphi_{left}$ and $\varphi_{right}$, then contexts, then (de)coding a bit of the coordinate x of the point, then updating the x-interval is performed iteratively until there is no more bit to be (de)coded. A halting criterion may be the length of the x-interval becoming minimal (e.g. one).

In order to obtain a faster implementation, the computation of the angles $\varphi_{left}$ and $\varphi_{right}$ may be performed by using a first order approximation from the older angles $\varphi_{left}$ and $\varphi_{right}$ and/or the prediction angle $\varphi_{pred}$.

When computing the averaged prediction angle $\varphi_{pred}$, it is advantageous to use the azimuthal angles of points belonging to an already (de)coded IDCM node because the coordinates of these point is known exactly, compared to the centers of volumes associated with nodes belonging to the tree that are only an approximation of point position, thus leading to prediction azimuthal angles $\varphi''_{al}$ with low error $e_{al}$ (equivalently a high quality) and then a more reliable averaged prediction angle $\varphi_{pred}$.

Optionally, the averaged prediction angle $\varphi_{pred}$ may be updated after computing the new x-interval. This angle $\varphi_{pred}$ is initially determined relatively to the azimuthal angle $\varphi_{cur}$ of the center of the IDCM current node, and it may turn out that, after having narrowed the x-interval, an extra additional elementary shift $+\Delta\varphi_h$ or $-\Delta\varphi_h$ may move the averaged prediction angle $\varphi_{pred}$ closer to the center of the new x-interval.

Thus, the above provides for efficient angular coding for IDCM.

Simple Azimuthal Angular Coding Mode in Predicted-Point Trees

In a further embodiment, the above azimuthal angular coding can be used with predicted-point trees. In the embodiments described below, it is assumed that the LiDAR main axis is vertical, or in other words parallel to the z-axis.

However, the main axis could be a different axis and the methods and embodiments described below could be adapted to such other axis.

Figure 31:
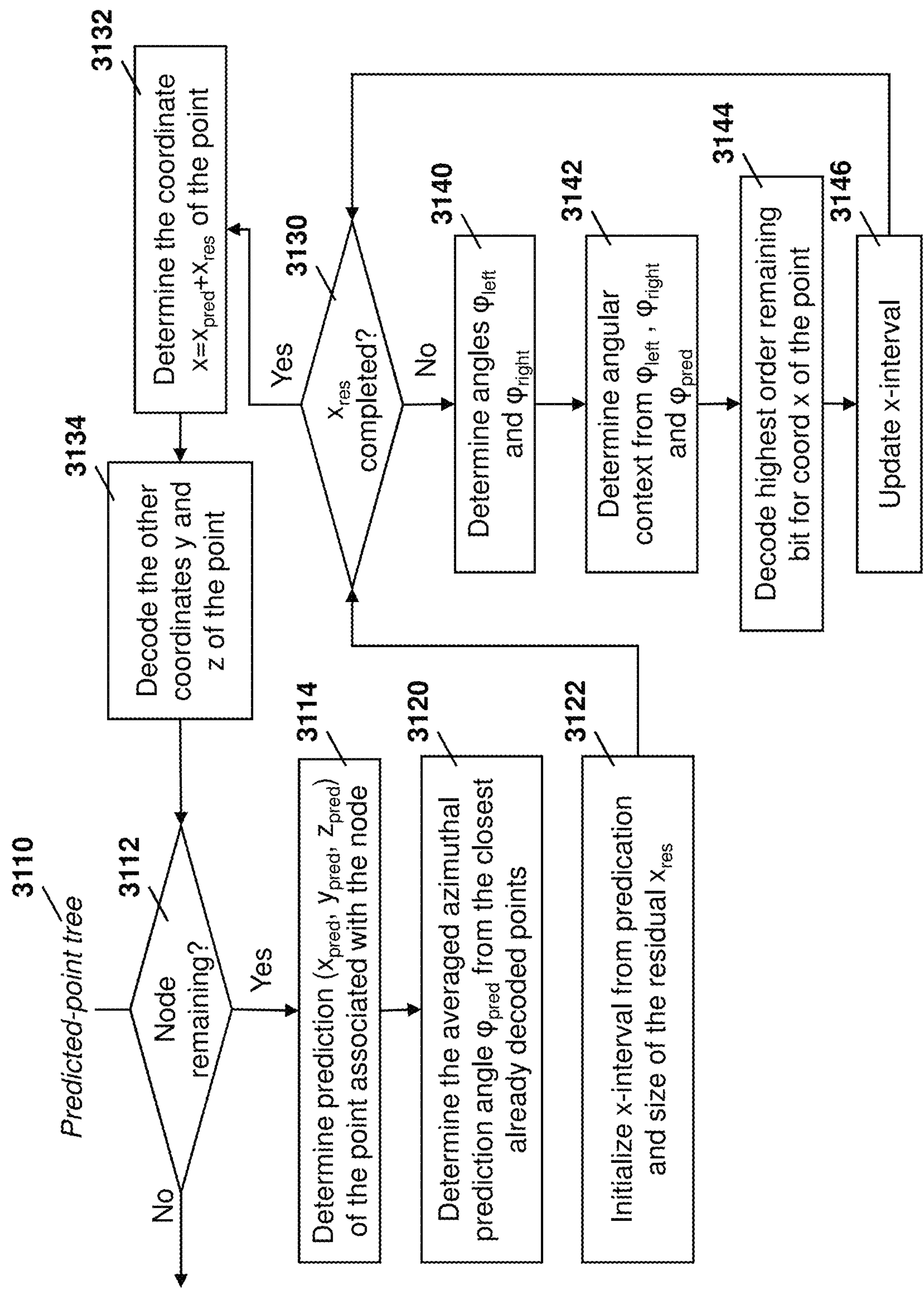
FIG. 31 shows a process diagram for using an azimuthal coding mode into a predicted-point tree.

Reference is now made to FIG. 31, which is a block diagram of a decoding process for simple azimuthal angular coding in predicted-point trees. The encoding process is straightforwardly deduced from this decoding process.

For a predicted-point tree 3110 the process proceeds to 3112 in which a check is made to determine whether there is any node remaining. If no, the process ends.

If there are nodes remaining, the process proceeds to block 3114 in which a prediction ($x_{pred}$, $y_{pred}$, $z_{pred}$) of the point associated with the node is made.

The process then proceeds to block 3120. At block 3120 the averaged prediction angle $\varphi_{pred}$ is determined relatively to the azimuthal angle of the prediction ($\varphi_{pred}$, $y_{pred}$, $z_{pred}$), this azimuthal angle may be computed by $\varphi_0$=atan 2 ($x_{pred}$, $y_{pred}$). The azimuthal angles $\varphi_{al}$ of already coded points from preceding already coded nodes are then shifted to obtain $\varphi''_{al}$ in the interval $[\varphi_0-\Delta\varphi_h/2, \varphi_0\Delta\varphi_h/2]$. For predictive-point tree, the location of a node in the space is assimilated to the position of its unique associated point. Consequently, the closest already coded nodes from a current node are understood as the already coded nodes for which their associated unique points are the closest from the unique point associated with the current node. Closest is understood as the least azimuthal distance.

A syntax signaling the magnitude such as the number of bits for the coding of the residual $x_{res}$ may be coded in the bitstream. This syntax is decoded, and the length of the initial x-interval is deduced from the decoded magnitude, shown at block 3122. For example, the number of bits needed to code $x_{res}$ may be coded using a unary variable length code and/or an entropy coder.

The position y of the initial x-interval may be taken as the value $y_{pred}$ of the y coordinate of the prediction ($x_{pred}$, $y_{pred}$, $z_{pred}$). In one embodiment, the coordinate $y=y_{pred}+y_{res}$ of the point is decoded first, before decoding the coordinate x, and the position y of the initial x-interval is taken as the decoded coordinate y of the point.

Further, in block 3122 the size of the residual $x_{res}$ may be initialized. More specifically, the residual $x_{res}$ may be coded, for example, by an exp-Golomb-like variable length code where the prefix signals the size (=number of bits) of the suffix. The suffix itself signals the value of the residual, which may be signed. When initializing the x-interval, the prefix may be decoded, and the length of the interval deduced from the decoded prefix. The center of the interval may be provided by the value $x_{pred}$ of the coordinate x of the predictor. The suffix is decoded by an iterative process on the x-interval.

From block 3122, the process proceeds to block 3130 in which a check is made to determine whether $x_{res}$ is completed. If yes, the process proceeds to block 3132 to determine the coordinate $x=x_{pred}+x_{res}$ of the point.

The process then proceeds to block 3134 in which the decoder may decode the other coordinates y and z of the point. From block 3134, the process may proceed to block 3112 to select the next remaining node.

Conversely, from block 3130, if $x_{res}$ is not completed, the process proceeds to block 3140. At block 3140, the decoder may determine the angles $\varphi_{left}$ and $\varphi_{right}$.

The process then proceeds to block 3142 in which the angular context from $\varphi_{left}$, $\varphi_{right}$ and $\varphi_{pred}$ is determined.

The process then proceeds to block 3144 in which the highest order remaining bit for the coordinate x of the point is decoded.

The process then proceeds to block 3146 in which the x-interval is updated. From block 3146, the process may then proceed back to block 3130 to determine whether the $x_{res}$ has been completed or not. A halting criterion in block 3130 may be the length of the x-interval becoming minimal (e.g. one).

In an example for the embodiment of FIG. 31, if x=32 and $x_{pred}$=43, then $x_{res}$=32−43=−11 is coded in the bitstream. The residual −11 belongs to the interval [−15, 16], which has $32=2^5$ values, and can be coded using 5 bits. The encoder thus encodes the prefix 5, using a unary code, each bit of the unary code being coded by a CABAC entropy coder in this example. Further the encoder encodes: the bits (0=left, 1=right) signaling to which sub-interval the residual belongs to:

0->the interval becomes [−15,0]

0->the interval becomes [−15,−8]

1->the interval becomes [−11,−8]

0->the interval becomes [−11,−10]

0->the interval becomes [−11,−11]

stops because the interval has length 1

These 5 bits are coded by an entropy coder (e.g. CABAC) that uses the angular context determined during the iterative process. The positions $x_{left}$ and $x_{right}$ are determined using the interval centered at the location of the predictor, i.e. $x_{pred}$=43. Therefore, the initial x-interval is 43+[−15,16]=[28,59], and since the left and right positions are located at ¼ and ¾ of the interval, one gets $x_{lef}$=35 and $x_{right}$=51, etc.

The second bit may be inferred because one may assume that the residual value $x_{res}$ does not belong to [−7,8] because otherwise the number of bits signaled by the prefix would be 4 or less. This inference of the second bit is systematic whatever the sign of the residual to code.

Because the sign of the residual value is usually unpredictable, it is common to signal by a flag if the residual is zero, if not code the sign by a bypass coding and then code the magnitude $|x_{res}-1|$. The coding process for the residual then becomes:

code a flag f0 to signal if $x_{res}$=0;

if f0 is false, code the sign of $x_{res}$, typically by using a bypass coding (e.g. pushing the sign bit);

code the prefix (=number of bits) using a unary code, each bit of the unary code being coded by a CABAC entropy coder;

code the bits (0=left, 1=right) signaling to which sub-interval the residual belongs.

Using the example above, the flag f0 is false because $x_{res}$ is not zero. Then, the sign is signaled minus (e.g. 0=minus, 1=plus) by a bypassed bit (e.g. 0). The first bit signaling the first sub-interval is then obviously inferred by the sign bit.

Optionally, the averaged prediction angle $\varphi_{pred}$ may be updated after computing the new x-interval. This angle $\varphi_{pred}$ is initially determined relatively to the azimuthal angle of the prediction ($x_{pred}$, $y_{pred}$, $z_{pred}$) and it may turn out that, after having narrowed the x-interval, extra additional elementary shifts $+\Delta\varphi_h$ or $-\Delta\varphi_h$ may move the averaged prediction angle $\varphi_{pred}$ closer to the center of the new x-interval.

Syntax the embodiments described herein require a decoder to know the elementary shifts in $\Delta\varphi_h$ and/or $\Delta\varphi_v$. These shifts may, for example, be sent to the decoder by being included into a bitstream compressed point cloud data. In this regard, appendix A shows various syntax that may be specified, with the added syntax for the above embodiments highlighted in bold and italics.

Apparatus

Figure 32:
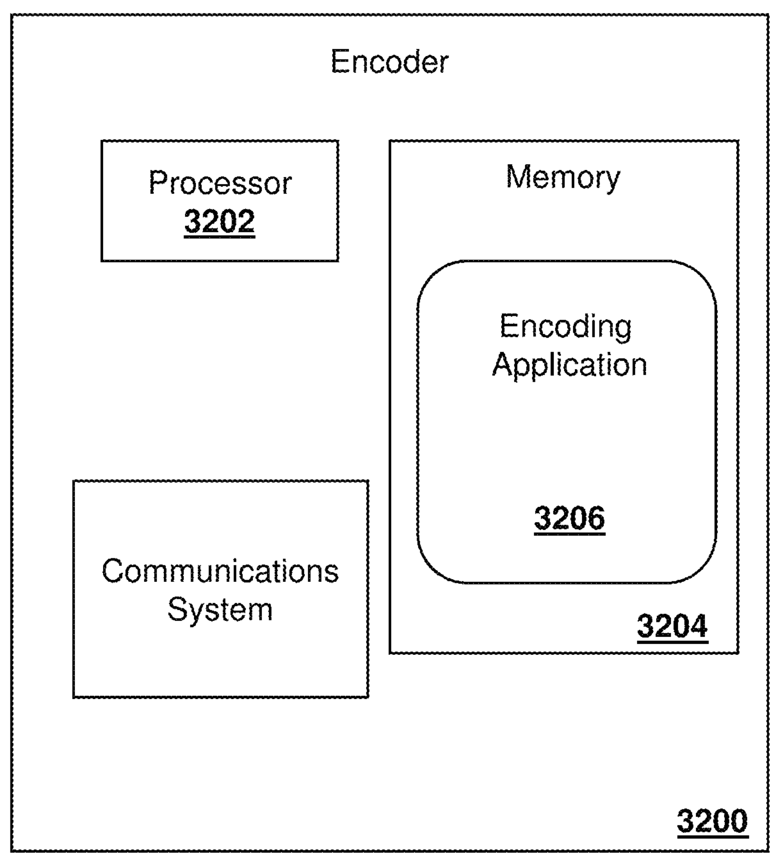
FIG. 32 shows an example simplified block diagram of an encoder.

Reference is now made to FIG. 32, which shows a simplified block diagram of an example embodiment of an encoder 3200. The encoder 3200 includes a processor 3202, memory 3204, and an encoding application 3206. The encoding application 3206 may include a computer program or application stored in memory 3204 and containing instructions that, when executed, cause the processor 3202 to perform operations such as those described herein. For example, the encoding application 3206 may encode and output bitstreams encoded in accordance with the processes described herein. It will be understood that the encoding application 3206 may be stored on a non-transitory computer-readable medium, such as a compact disc, flash memory device, random access memory, hard drive, etc. When the instructions are executed, the processor 3202 carries out the operations and functions specified in the instructions so as to operate as a special-purpose processor that implements the described process(es). Such a processor may be referred to as a "processor circuit" or "processor circuitry" in some examples.

Figure 33:
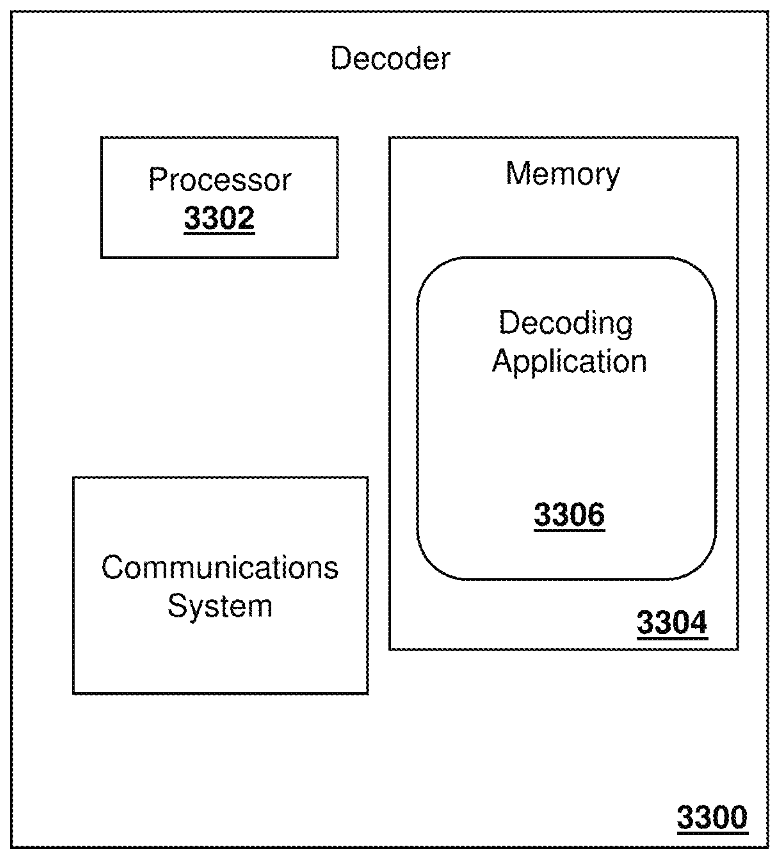
FIG. 33 shows an example simplified block diagram of a decoder.

Reference is now also made to FIG. 33, which shows a simplified block diagram of an example embodiment of a decoder 3300. The decoder 3300 includes a processor 3302, a memory 3304, and a decoding application 3306. The decoding application 3306 may include a computer program or application stored in memory 3304 and containing instructions that, when executed, cause the processor 3302 to perform operations such as those described herein. It will be understood that the decoding application 3306 may be stored on a computer-readable medium, such as a compact disc, flash memory device, random access memory, hard drive, etc. When the instructions are executed, the processor 3302 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Results

In the above embodiments, by using the averaged prediction angle $\varphi_{pred}$ to select the context of the plane position planeXPosition and planeYPosition in the planar mode, the lossless compression of LiDAR-acquired data has been found to have been improved by about 15%, i.e. the resulting bitstream size has been reduced by 15%, compared to the anchor being the MPEG Test Model currently developed in a standardization effort on point cloud compression.

Certain adaptations and modifications of the described embodiments can be made. Therefore, the above discussed embodiments are considered to be illustrative and not restrictive.

APPENDIX A—SYNTAX

TABLE 2

```
Syntax
angular_flag                                                   u(1)
if(angular_flag) {
  num_of_heads_flag                                            u(1)
  if (num_of_heads_flag) // if not num_of_heads inferred to 1
          num_of_heads_minus2                                  u(8)
  for each head {
      head_absolute_is_000_flag                                u(1)
      if (!head_absolute_is_000_flag)
          head_absolute_x                                      s(32)
          head_absolute_y                                      s(32)
          head_absolute_z                                      s(32)
   }
    head_parallel_to_axis_flag                                 u(1)
      if (head_parallel_to_axis_flag)
        axis_index                                             u(2)
    else {
          head_orientation_phi                                 u(32)
          head_orientation_theta                               u(32)
      }
    num_of_lasers                                              u(10)
    elementary_shift_H                                         s(32)
      for each laser L {
          elementary_shift_V[L]                                s(32)
          angle_is_tangent_flag                                u(1)
          laser_angle                                          s(32)
          laser_relative_position_to_head_flag                 u(1)
          if (laser_relative_position_to_head_flag) {
            laser_relative_position_dL                         s(16)
            relative_position_rL_flag                          u(1)
           if (relative_position_rL_flag)
              laser_relative_position_rL                       s(16)
              }
      } // end relative position
    } // end laser
  } // end head
} // end angular
```

Below is the associated semantics for Table 2.

angular_flag equal to 0, indicates that heads and lasers information is not present in the syntax, Angular_flag equal to 1, indicates that heads and lasers information is present in the syntax. When equal to 0 the coding method for the node do not use angular information. See IDF 50916.

num_of_heads_flag equal to 0, indicates that the number_of_of (Lidar's) heads is inferred to be one. If num_of_heads_flag equal to 1, it indicate that num_of_heads_minus2 is present in the syntax, and the number of Lidars/heads is equal to num_of_heads_minus2+2. When not present in the bitstream, the number_of_Lidars/heads is inferred to be zero.

head_absolute_is_000_flag equal to 1 indicates that the head absolute position is inferred to x=y=z=0. When head_absolute_is_000_flag equal to 0, it indicates that head_absolute_x, head_absolute_y and head_absolute_z are present in the bitstream to signal the absolute head position. Absolute is understood as the in the xyz coordinate system in which the point cloud is represented.

head_absolute_x indicates the absolute position on the x axis of the head (capturing device) on 32-bit signed integer with 3 bits of decimal precision, such that the x absolute position of the head is head_absolute_x/8.

head_absolute_y indicates the absolute position on the x axis of the head (capturing device) on 32-bit signed integer with 3 bits of decimal precision, such that the x absolute position of the head is head_absolute_y/8 head_absolute_z indicates the absolute position on the x axis of the head (capturing device) on 32-bit signed integer with 3 bits of decimal precision, such that the x absolute position of the head is head_absolute_z/8 head_parallel_to_axis_flag equal to 1 indicates that the head is oriented parallel to an axis. In this case, axis_index is present in the stream. head_parallel_to_axis_flag equal to 0 indicates that the head is not oriented parallel to an axis, and in this case head_orientation_phi and head_orientation_theta are present in the stream instead of axis_index.

axis_index indicates which axis the head is parallel to. axis_index equal 0 indicates that the head is oriented parallel to the x axis, equal 1 indicates that the head is oriented parallel to the y axis, and equal 2 indicates that the head is oriented parallel to the z axis.

head_orientation_phi and head_orientation_theta indicates the orientation in spherical coordinates. head_orientation_phi is the azimutal angle in the xy plane, and head_orientation_theta is the polar angle relative to the z axis. Both are signed 32-bit integers with 18 bits of decimal precision.

num_of_lasers specifies the number of lasers (or beams) for a given head. It is a 10-bit integer in the range of 1 to 1023.

elementary_shift_H indicates the azimuthal angular elementary shift between two points consecutively probed by a same laser of a head angle_is_tangent_flag equal to 1 indicates that the information provided by laser_angle is the tangent of an angle. angle_is_tangent_flag equal to 0 indicates that the information provided by laser_angle is an angle.

elementary_shift_V[L] indicates the azimuthal angular elementary shift between two points consecutively probed by a laser L and a next laser L+1 of a head laser_angle is the (tangent of) the angle associated with a given laser, this is the altitude angle relative to the plane perpendicular to the head direction and to which belongs the laser (or beam emitter) position. It is ae signed 32-bit integers with 18 bits of decimal precision.

laser_relative_position_to_head_flag equal to 0 indicates that the laser/beam emitter position is the same as the head absolute position. laser_relative_position_to_head_flag equal to 1 indicates that the laser/beam emitter position is not the same as the head absolute position; in this case laser_relative_position_dL and relative_position_rL_flag are present in the bitstream.

laser_relative_position_dL indicates the position of the laser (beam emitter) relative to the head absolute position along the direction of orientation of the head. It is a 16-bit signed integer with 3 bits of decimal precision.

relative_position_rL equal to 0 indicates that laser_relative_rL is not present in the bitstream and is inferred to 0. relative_position_rL equal to 1 indicates that laser_relative_rL is present in the bitstream 0.

laser_relative_rL indicates the distance of the laser (beam emitter) from the line parallel to the direction of orientation of the head passing by the head absolute position. It is a 16-bit signed integer with 3 bits of decimal precision.

The invention claimed is:

1. A method of decoding a bitstream of compressed point cloud data representing a three-dimensional location of an object, for generating a point cloud data, the point cloud being located within a volumetric space and represented by a tree, the method comprising:

determining at least one closest, relative to azimuthal distance, coded node to a current node of the tree, wherein the determining excludes nodes that are larger in size than the current node and/or excludes nodes that are greater than a threshold azimuthal distance from the current node;

determining an azimuthal prediction angle for the at least one closest coded node;

selecting an angular azimuthal context based on the determined azimuthal prediction angle; and decoding, from the bitstream, information representative of the current node based on the angular azimuthal context to generate the point cloud data.

2. The method of claim 1, wherein the at least one closest coded node comprises a plurality of closest coded nodes and the determined azimuthal prediction angle is an averaged azimuthal prediction angle determined based on:

$$\varphi_{pred} = \sum_{\substack{already\ coded\\ nodes}} \frac{\varphi_{al}}{e_{al}} / \sum_{\substack{already\ coded\\ nodes}} \frac{1}{e_{al}} \tag{13}$$

where $\varphi_{pred}$ is the averaged azimuthal prediction angle, $\varphi_{al}$ is a respective azimuthal prediction angle of one of the closest coded nodes, and $e_{al}$ is a respective error in one of the closest coded nodes.

3. The method of claim 1, wherein the decoding is in a planar mode, and wherein the method further comprises determining a left azimuthal angle and a right azimuthal angle for the current node, wherein the selecting the angular azimuthal context further comprises at least one of the following:

assigning a first bit based on whether the determined azimuthal prediction angle minus the left azimuthal angle has the same sign as the determined azimuthal prediction angle minus the right azimuthal angle;

assigning a second bit based on which of the determined azimuthal prediction angle minus the left azimuthal angle and the determined azimuthal prediction angle minus the right azimuthal angle has a largest absolute magnitude; and providing a quantized context index based on a magnitude difference between the determined azimuthal prediction angle minus the left azimuthal angle and the determined azimuthal prediction angle minus the right azimuthal angle, times an inverse of a radius to the current node.

4. The method of claim 3, wherein the method further comprises selecting an x plane position and/or a y plane position for azimuthal prediction based on a location of the current node relative to the x axis or the y axis.

5. The method of claim 1, wherein the decoding is in an inferred direct coding mode ("IDCM"), and wherein the method further comprises:

initializing a coordinate interval;

recursively splitting the interval by:

determining a left azimuthal angle and a right azimuthal angle for the interval;

performing the selecting the angular azimuthal context by further using the left azimuthal angle and the right azimuthal angle with the determined azimuthal prediction angle;

performing the decoding of information representative of the coordinate of a point belonging the current node; and updating, after the decoding, the coordinate interval.

6. The method of claim 5, wherein the determining the left azimuthal angle and the right azimuthal angle are based on two points located at ¼ and ¾ of the Interval.

7. The method of claim 5, wherein the determining the left azimuthal angle and a right azimuthal angle uses a first order approximation from previous values of the left azimuthal angle and a right azimuthal angle and/or the determined azimuthal prediction angle.

8. The method of claim 1, wherein the decoding uses a predicted-point tree, and wherein the method further comprises:

determining a prediction of a point associated with the current node prior determining the determined azimuthal prediction angle;

initializing a coordinate interval for a coordinate from the prediction of the point and a size of a residual;

for each bit in the residual:

determining a left azimuthal angle and a right azimuthal angle for the interval;

performing the selecting the angular azimuthal context by further using the left azimuthal angle and the right azimuthal angle with the determined azimuthal prediction angle;

performing the decoding for the highest order remaining bit for the coordinate; and updating, after the decoding, the coordinate interval.

9. The method of claim 5, further comprising updating the determined azimuthal prediction angle after updating the coordinate interval.

10. A decoder for decoding a bitstream of compressed point cloud data to produce a reconstructed point cloud representing a three-dimensional location of a physical object, the point cloud data being located within a volumetric space, the decoder comprising:

a processor;

a memory; and a decoding application containing instructions executable by the processor that, when executed, cause the processor to:

determine at least one closest, relative to azimuthal distance, coded node to a current node of the tree, wherein the determining excludes nodes that are larger in size than the current node and/or excludes nodes that are greater than a threshold azimuthal distance from the current node;

determine an azimuthal prediction angle for the at least one closest coded node; select an angular azimuthal context based on the determined azimuthal prediction angle; and decode, from the bitstream, information representative of the current node based on the angular azimuthal context to generate the point cloud data.

11. A non-transitory processor-readable medium storing processor-executable instructions that, when executed by a processor, cause the processor to:

determine at least one closest, relative to azimuthal distance, coded node to a current node of the tree;

determine an azimuthal prediction angle for the at least one closest coded node, wherein the determining excludes nodes that are larger in size than the current node and/or excludes nodes that are greater than a threshold azimuthal distance from the current node;

select an angular azimuthal context based on the determined azimuthal prediction angle; and decode, from the bitstream, information representative of the current node based on the angular azimuthal context to generate the point cloud data.

12. The decoder of claim 10, wherein the at least one closest coded node comprises a plurality of closest coded nodes and the determined azimuthal prediction angle is an averaged azimuthal prediction angle determined based on:

$$\varphi_{pred} = \sum_{\substack{already\ coded \\ nodes}} \frac{\varphi_{al}}{e_{al}} / \sum_{\substack{already\ coded \\ nodes}} \frac{1}{e_{al}} \tag{13}$$

where $\varphi_{pred}$ is the averaged azimuthal prediction angle, $\varphi_{al}$ is a respective azimuthal prediction angle of one of the closest coded nodes, and $e_{al}$ is a respective error in one of the closest coded nodes.

13. The decoder of claim 10, wherein the decoding is in a planar mode, and wherein the processor is further caused to determine a left azimuthal angle and a right azimuthal angle for the current node, wherein the processor is caused to select the angular azimuthal context by at least one of the following:

assigning a first bit based on whether the determined azimuthal prediction angle minus the left azimuthal angle has the same sign as the determined azimuthal prediction angle minus the right azimuthal angle;

assigning a second bit based on which of the determined azimuthal prediction angle minus the left azimuthal angle and the determined azimuthal prediction angle minus the right azimuthal angle has a largest absolute magnitude; and providing a quantized context index based on a magnitude difference between the determined azimuthal prediction angle minus the left azimuthal angle and the determined azimuthal prediction angle minus the right azimuthal angle, times an inverse of a radius to the current node.

14. The decoder of claim 13, wherein the processor is further caused to select an x plane position and/or a y plane position for azimuthal prediction based on a location of the current node relative to the x axis or the y axis.

15. The decoder of claim 10, wherein the decoding is in an inferred direct coding mode ("IDCM"), and wherein the processor is further caused to:

initialize a coordinate interval;

recursively split the interval by:

determining a left azimuthal angle and a right azimuthal angle for the interval;

performing the selecting the angular azimuthal context by further using the left azimuthal angle and the right azimuthal angle with the determined azimuthal prediction angle;

performing the decoding of information representative of the coordinate of a point belonging the current node; and updating, after the decoding, the coordinate interval.

16. The decoder of claim 15, wherein the determining the left azimuthal angle and the right azimuthal angle are based on two points located at ¼ and ¾ of the interval.

17. The decoder of claim 15, wherein the determining the left azimuthal angle and a right azimuthal angle uses a first order approximation from previous values of the left azimuthal angle and a right azimuthal angle and/or the determined azimuthal prediction angle.

18. The decoder of claim 10, wherein the decoding uses a predicted-point tree, and wherein the processor is further caused to:

determine a prediction of a point associated with the current node prior determining the determined azimuthal prediction angle;

initialize a coordinate interval for a coordinate from the prediction of the point and a size of a residual;

for each bit in the residual:

determine a left azimuthal angle and a right azimuthal angle for the interval;

perform the selecting the angular azimuthal context by further using the left azimuthal angle and the right azimuthal angle with the determined azimuthal prediction angle;

perform the decoding for the highest order remaining bit for the coordinate; and update, after the decoding, the coordinate interval.

* * * * *

UNITED STATES PATENT AND TRADEMARK OFFICE

CERTIFICATE OF CORRECTION

PATENT NO. : 12,307,728 B2
APPLICATION NO. : 17/771246
DATED : May 20, 2025
INVENTOR(S) : Jonathan Taquet and Sébastien Lasserre It is certified that error appears in the above-identified patent and that said Letters Patent is hereby corrected as shown below:

In the Claims

Column 30, Lines 34-37 (approx), within formula in Claim 2 please delete "$\varphi_{al}$" and insert -- $\varphi''_{al}$ --, therefor.

Column 30, Line 40, in Claim 2 please delete "$\varphi_{al}$" and insert -- $\varphi''_{al}$ -- , therefor.

Column 31, Line 18, in Claim 6 please delete "Interval." and insert -- interval. --, therefor.

Column 32, Lines 23-25 (approx), within formula in claim 12 please delete "$\varphi_{al}$" and insert -- $\varphi''_{al}$ --, therefor.

Column 32, Line 28, in Claim 12 please delete "$\varphi_{al}$" and insert -- $\varphi''_{al}$ -- , therefor.

Signed and Sealed this
Fifth Day of August, 2025

Coke Morgan Stewart
*Acting Director of the United States Patent and Trademark Office*